United States Patent
Gross et al.

(10) Patent No.: US 6,553,515 B1
(45) Date of Patent: Apr. 22, 2003

(54) SYSTEM, METHOD AND COMPUTER PROGRAM PRODUCT FOR DIAGNOSTIC SUPERVISION OF INTERNET CONNECTIONS

(75) Inventors: Charles J. Gross, Earlysville, VA (US); James R. Hartless, Faber, VA (US); Vijay K. Sharma, Charlottesville, VA (US); Michael A. Starr, Charlottesville, VA (US)

(73) Assignee: Comdial Corporation, Sarasota, FL (US)

( * ) Notice: Subject to any disclaimer, the term of this patent is extended or adjusted under 35 U.S.C. 154(b) by 0 days.

(21) Appl. No.: 09/393,659

(22) Filed: Sep. 10, 1999

(51) Int. Cl.[7] .................................................. G06F 11/00
(52) U.S. Cl. ............................... 714/47; 714/4; 714/25; 714/43; 709/224
(58) Field of Search ................................ 714/47, 4, 25, 714/43, 48, 44, 56, 46, 57; 709/224

(56) References Cited

U.S. PATENT DOCUMENTS

| | | | | |
|---|---|---|---|---|
| 5,655,068 A | * | 8/1997 | Opoczynski | 714/4 |
| 5,696,701 A | * | 12/1997 | Burgess et al. | 702/186 |
| 6,108,800 A | * | 8/2000 | Asawa | 714/26 |
| 6,138,249 A | * | 10/2000 | Nolet | 714/25 |
| 6,205,413 B1 | * | 3/2001 | Bisdikian et al. | 703/23 |
| 6,237,114 B1 | * | 5/2001 | Wookey et al. | 714/47 |
| 6,286,058 B1 | * | 9/2001 | Hrastar et al. | 709/218 |
| 6,289,379 B1 | * | 9/2001 | Urano et al. | 709/223 |
| 6,367,037 B1 | * | 4/2002 | Remer et al. | 710/105 |
| 6,470,385 B1 | * | 10/2002 | Nakashima et al. | 709/224 |

* cited by examiner

*Primary Examiner*—Robert Beausoliel
*Assistant Examiner*—Christopher R. McGrath
(74) *Attorney, Agent, or Firm*—Sterne, Kessler, Goldstein & Fox

(57) ABSTRACT

A system, method and computer program product for managing diagnostic and performance information for communications system terminal endpoints (TEs) communicating over an Internet Protocol (IP) network. The TEs communicate by connections that are voice, modem, facsimile, video, data transmissions, or the like. A Diagnostic Supervisor (DS) transmits Diagnostic Configuration Messages (DCMs) to the TEs. The TE's generate Diagnostic Messages (DMs) based on diagnostic information, including error statistics, voice statistics, facsimile statistics, video statistics, data statistics, or the like, concerning IP network connections in which the TEs participate. The DCMs instructs the TEs how to format and when to transmit DMs. The DMs are transmitted by the TEs to the DS. In a system with more that one DS, the TEs can transmit DMs to the plural DSs, other TEs or any network devices. The DS can be programmed locally or remotely to send various types of DCMs. The DS can also be programmed locally or remotely to provide diagnostic reports based on DMs to network users or to the network administrator. Diagnostic information is used for disconnect supervision, answer detection, attendant supervision, billing management, rerouting of IP connections to the PSTN, and the like.

54 Claims, 13 Drawing Sheets

SYSTEM, METHOD AND COMPUTER PROGRAM PRODUCT FOR DIAGNOSTIC SUPERVISION OF INTERNET CONNECTIONS

BACKGROUND OF THE INVENTION

1. Field of the Invention

This invention generally relates to communications, and more specifically to a system, method and computer program product for diagnostics supervision of Internet connections, such as VoIP calls.

2. Related Art

The uses of the public Internet are very diverse. A use that has recently gained much attention is Voice-over-Internet Protocol (VoIP) technology, which involves using the public Internet or a private IP network to carry voice calls, either partially or completely bypassing the public switched telephone network (PSTN).

VoIP, as well as video conferencing, has been used by computer hobbyists to place no-charge (and typically low-quality) calls over the Internet, using microphones, video cameras, and speakers connected to a personal computer (PC) audio card supported by audio/video software. Commercial applications of VoIP technology are now emerging. Various types of services can be provided using VoIP, including enterprise toll bypass, IP-based IntereXchange Carrier (IXC; long distance) service, and IP-based local telephony.

A drawback of existing implementations is the use of the User Datagram Protocol (UDP) to provided bandwidth not available using TCP. UDP is the connectionless transport protocol in the TCP/IP protocol layers. UDP does not provided for error detection/correction or any other quality of service (QoS) within the existing protocol. Thus, the quality and connection of calls is uncertain.

What is needed is a technique to better control Internet connections, such as VoIP calls, by providing real-time information about the quality of inbound and outbound voice, modem, facsimile, video streams, and the like.

SUMMARY OF THE INVENTION

The present invention is directed to a system, method and computer program product for managing diagnostic and performance information for communications system terminal endpoints (TEs) communicating over an Internet Protocol (IP) network. The TEs communicate by connections that are voice, modem, facsimile, video or data transmissions.

A Diagnostic Supervisor (DS), which is capable of being coupled to the communications system, transmits Diagnostic Configuration Messages (DCMs) to the TEs. The TE's generate Diagnostic Messages (DMs) based on diagnostic information, including error statistics, voice statistics, facsimile statistics, video statistics, data statistics, or the like, concerning IP network connections in which the TEs participate. The DCMs instructs the TEs how to format and when to transmit DMs. The flexibility afforded by the DCMs allows large amounts of customized diagnostic information to be delivered in a non-intrusive manner by limiting the transmission of diagnostic information only when required. The DMs are transmitted by the TEs to the DS. In a system with more that one DS, the TEs can transmit DMs to the plural DSs, other TEs or any network device.

The DS can be programmed locally or remotely to send various types of DCMs. The DS can also be programmed locally or remotely to provide diagnostic reports based on DMs that were delivered to network users or to the network administrator, for example.

In one embodiment of the present invention, the system can reroute an IP network connection between two or more TEs to the public switched telephone network (PSTN) based on the diagnostic information. Rerouting can be initiated by the DS, a TE, or by a TE with DS capabilities. Alternatively, rerouting can be initiated by a TE user, the network administrator or a communications system attendant.

In another embodiment of the present invention, DCMs can be configured to instruct TEs to transmit DMs including silent packet diagnostic information. The silent packet diagnostic information can be used to provide the system with disconnect supervision of IP connections by determining the average number of silent packets detected over a period of time, or by a total count of silent packets.

In still another embodiment of the present invention, DCMs can be configured to instruct TEs to transmit DMs including non-silent packet diagnostic information. The non-silent packet diagnostic information can be used to provide the system with answer detection supervision of IP connections by determining the average number of non-silent packets detected over a period of time, or by a total count of non-silent packets.

In yet another embodiment of the present invention, the diagnostic information comprises a plurality of parameters defined by the DCMs and the DMs. A DS or TE can be programmed to determine an average number of occurrences of one of the plurality of parameters or a total number of occurrences of one of the plurality of parameters.

One embodiment of the present invention provides for attendant supervision of the communications system. In this embodiment a human attendant provides real-time response to the diagnostic information. Alternatively, billing management can be performed for the communications system using diagnostic information. For example, billing of an IP network connection, or a connection rerouted to the PSTN, is performed based on the diagnostic information provided by DMs.

In a preferred embodiment of the present invention, the DS comprises a Configuration Manager, a Report Manager, a Real-Time Response Manager, and an Input/Output (I/O) Manager coupled to the IP network and the PSTN. The DS can also include a communications system so that it can function as a TE.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

I. OVERVIEW

Figure 1:
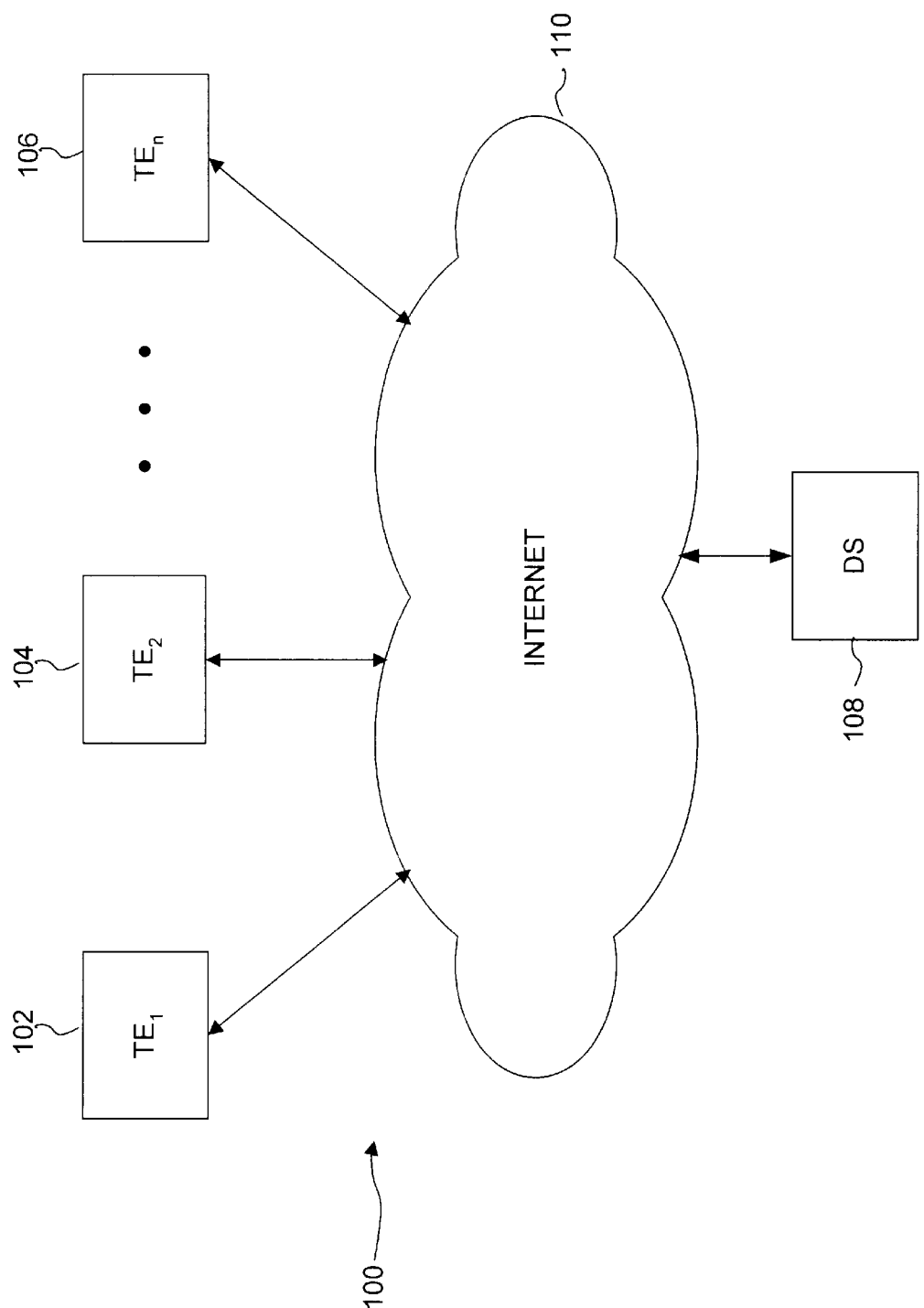
FIG. 1 illustrates a system for communicating diagnostics or other feedback concerning IP connections from one or more terminal endpoints (TEs) to a Diagnostic Supervisor (DS) according to an embodiment of the present invention.

The following section is an overview of basic Internet-related concepts, as discussed in PricewaterhouseCoopers' Technology Forecast: 1999 (PricewaterhouseCoopers Technology Center, Menlo Park, Calif., 94025; order #TC-01-09).

Voice calls or facsimile transmissions, which are not distinguished from voice calls by the phone network, must first be converted from analog signals into digital form. This conversion is performed by a codec (compression/decompression), which can be implemented either in software or special-purpose hardware. Digitally encoding of voice calls is also done in the PSTN for interoffice transmission by systems such as private branch exchanges (PBXs). However, the codecs used for VoIP use bandwidth more efficiently than the those used in the PSTN, carrying voice in as little as 5 Kbps compared with the 64 Kbps needed by the phone network.

Once digitized, the encoded voice data is then wrapped within IP packets, using a Real-Time Transport Protocol (RTP), which runs over UDP. (UDP is the connectionless transport protocol in the TCP/IP protocol suite; it serves as the counterpart to TCP, which is the connection-oriented protocol.) IP packets then are carried over a TCP/IP network. Call setup and control-type features for voice, modem, facsimile, video and data systems are, based on the H.323 Internet telephony standard (described below).

It is desirable to incorporate some form of quality of service (QoS) features that can give a higher priority to delay-sensitive traffic such as voice than to less-delay-sensitive data. These features can be provided by resource reservation protocol (RSVP) or by other mechanisms that enable network administrators to deliver traffic defined as high priority (such as video conferences) before less time-sensitive traffic.

A. VoIP-to-PSTN Gateway

A VoIP-to-PSTN gateway is typically used to permit access to all telephone devices, not merely those connected to an IP network. The gateway functions to convert the calls between analog voice and packet data and translates between the VoIP call control system and the protocols used in the PSTN (such as, Signaling System 7 (SS7)).

Most VoIP-based IXCs provide a bank of incoming phone lines at each of their points of presence (POPs). To initiate a network call, a user calls the VoIP gateway from a standard analog telephone or fax machine. The gateway provides either a simulated dial tone or some other tone. The user enters the destination telephone number as well as a personal identification number (PIN) for billing. The IXC establishes an IP connection between the user's local POP and another POP close to the call's destination. The destination gateway then places a standard local call to the final destination, and the voice or fax link is created. In practice, an Internet Exchange Carrier (IXC) system typically would be more integrated into the local phone network than suggested here, so that the subscriber would dial the long-distance phone number, and the calling number as well as the call itself would be transmitted transparently over the local phone network to the POP.

B. The H.323 Internet Telephony Standard

H.323 is an Internet telephony standard from the ITU-T that defines multimedia communication over packet-switched networks that do not provide guaranteed QoS. H.323 is an extension of the original H.320 standard, which specified criteria for video conferencing over ISDN and other circuit-switched networks. H.323 extends H.320 for use on networks such as the Internet and private IP networks. H.323 is adapted to support many aspects of multimedia, but requires only voice and, as such, generally is regarded as the standard for VoIP. H.323 defines the basic capabilities Internet telephony software must support, and it specifies requirements for call control, audio, and video compression technologies.

The H.323 standard is directed to the types of data streams required for Internet telephony. All telephone software must support specified audio (such as speech) and call-control signals that permit telephones to find each other, determine each other's characteristics, and then monitor call status. This standard also specifies lowest-common denominator compression protocols, such as G.711 (audio compression over 64-Kbps data path), G.723 and G.729 (audio compression over an analog modem). H.323 also specifies the functions to be performed by a network control server, known as the "gatekeeper."

Currently, H.323 requires that Internet telephones also adhere to H.245, the ITU-T standard for telephony control functions. H.245, along with the associated H.225.0 and Q.931 standards, defines how a phone should connect to another phone over the Internet, start a conversation, determine the capabilities of the receiving phone, and hang up a call. During call initiation, the devices use H.245 to determine proper compression protocols and also whether the phones support full-duplex or half-duplex transmission.

They also agree on what resolution is recommended for video, which encryption capabilities are supported or desired, and the maximum "jitter" (variation in delivery time for data packets) that will be allowed before the session is terminated.

Other Internet standards are under development, including the Session Initiation Protocol (SIP) and the Simple Gateway Control Protocol (SGCP). SIP, a signaling protocol for Internet conferencing and telephony, handles basic call setup functions as well as enhanced services such as call forwarding. SIP addresses users by an e-mail-like address and reuses some of the infrastructure used for Internet e-mail delivery such as DNS MX (Domain Name System mail forwarding) records. In addition to its own address format, SIP can handle H.323 addresses or telephone numbers (as defined by the E.164 standard). SGCP is part of a VoIP architecture that distributes the voice-to-IP gateway functions between the actual gateways, which perform translation between voice signals and IP packets, and a server known as the "call agent," which handles complex signaling protocols such as SS7. SGCP handles the communication between the call agent and the gateways. SGCP primarily is designed to serve as a simple "remote control" protocol that the call agent uses to program gateways according to instructions received through signaling protocols such as H.323 or SIP.

C. Real-Time Transport Protocol and Real-Time Control Protocol

The Real-Time Transport Protocol (RTP) handles end-to-end, real-time delivery of data such as video and voice. RTP transports data over the UDP and does not guarantee in-time delivery, order of delivery, or even delivery at all. RTP provides functionality that is required for real-time multimedia traffic, including content identification, timing reconstruction, loss detection, and security. With RTP, data can be delivered to one or more destinations, and limits any delay, variation. Although RTP can take advantage of resource reservation protocols such as RSVP, communicating dynamically to allocate appropriate bandwidth, but RTP itself does not provide for guaranteed bandwidth or other QoS features.

Time stamps and header information are provided by RTP, which distinguish whether an IP packet is data or voice, allowing prioritization of voice packets. RSVP allows networking devices to reserve bandwidth for carrying unbroken multimedia data streams.

A companion protocol to RTP is Real-Time Control Protocol (RTCP), which analyzes network conditions. RTCP provides feedback to RTP data sources and recipients in a periodic transmission fashion. RTCP permits adjustment to changing network loads by reporting to senders and receivers various types of variations in network performance.

II. SYSTEM DESCRIPTION OF THE PRESENT INVENTION

A system 100 for communicating diagnostics or other feedback concerning Internet connections from one or more terminal endpoints $TE_1-TE_n$ (102, 104 through 106, respectively) to a Diagnostic Supervisor (DS) 108 as illustrated in FIG. 1. The connections between the TEs and the DS are performed using Internet protocol, as shown generally at Internet cloud 110. According to the present invention, the Internet cloud 110 may be the public Internet or private internet. As will be described in detail below, according to the present invention the terminal endpoints ($TE_1-TE_n$) are programmable to provide diagnostic information over the Internet 110 to each other or to the DS 108. The diagnostics are dependent on the type of connection, which can be either an Internet telephone voice call, transfer of video, facsimile, data, or control information. Known methods and protocols to communicate voice, modem, facsimile, video, data and control information over the Internet 110 would be apparent to a person skilled in the relevant arts of Internet telephony and VoIP.

Diagnostic information provided in this matter can give a network administrator advance warning of client problems, and/or historical data performance profiles. This can allow the network administrator to initiate solutions perhaps even in advance of the client's recognition of the problem. A plethora of uses for diagnostic information can be provided according to the present invention as envisioned by the inventors. Many of the uses of diagnostic information according to the present invention are described below by way of example and not limitation.

Figure 2:
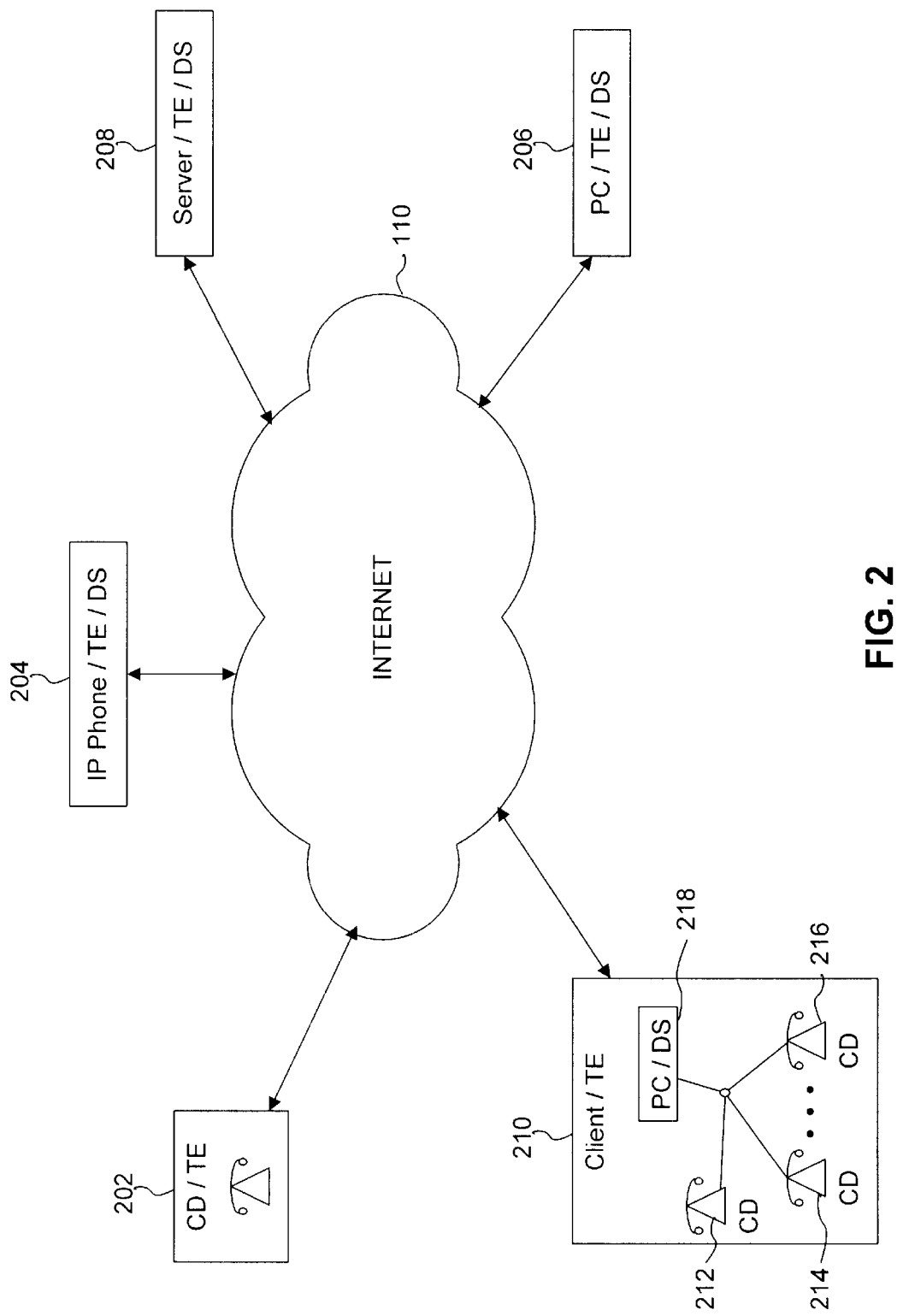
FIG. 2 illustrates various types of TEs in a system similar to that depicted in FIG. 1 for communicating diagnostics or other feedback concerning IP connections according to another embodiment of the, present invention.

The terminal endpoints 102, 104–106 of FIG. 1 can be implemented in a variety of ways. FIG. 2 illustrates various types of terminal endpoints in a system similar to that depicted in FIG. 1 for communicating diagnostics or other feedback concerning Internet connections according to the present invention. In the simplest form a terminal endpoint is a communication device, such as a standard telephone with an IP gateway, which is illustrated at 202. Alternatively, a terminal end point can comprise an Internet phone, as illustrated at 204. Moreover, the Internet phone 204 can include the functionality of a diagnostic supervisor. Another example of a terminal endpoint is a personal computer 206, which can also function as a diagnostic supervisor. Other examples of terminal endpoints include servers and clients. A server terminal endpoint is illustrated in 208, which can also serve as a diagnostic supervisor. FIG. 2 also illustrates a client terminal endpoint 210. The client/TE 210 is effectively a node capable of switching between a plurality of communication devices such as phones 212, 214 through 216. Alternatively, a personal computer communication device or a personal computer communication device also functioning as a diagnostic supervisor can be connected to the node and be part of the client/TE210. Such a PC/DS is illustrated at 218. A server 208 keeps all the general info about a network's configuration. It is also considered a master of the network, unless it's functions are distributed.

Figure 3:
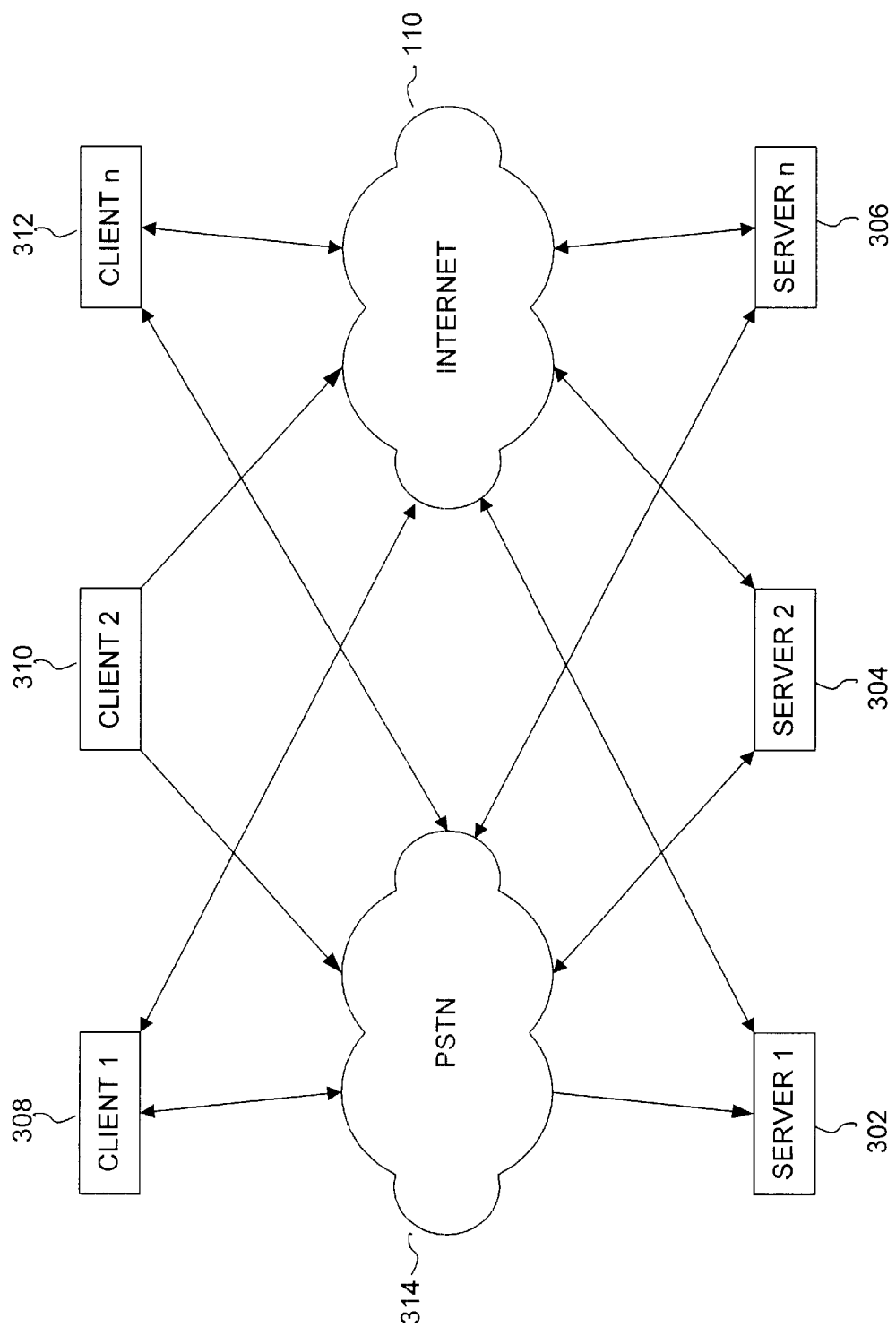
FIG. 3 illustrates a distributed diagnostics management system of servers and clients that communicate via the Internet according to another embodiment of the present invention.

FIG. 3 illustrates a distributed diagnostics management system of servers (302, 304–306) and clients (308, 310–312), which communicate via the Internet 110. IP connections between servers and clients, between plural servers, or between plural clients can also be routed via the PSTN 314. In this embodiment, the diagnostic supervisory functions can be distributed or can be redundant between multiple servers, such as server 1, or server 2 through server n. The exemplary functions to be performed by a diagnostic supervisor will now be described in connection with FIG. 4.

Figure 4:
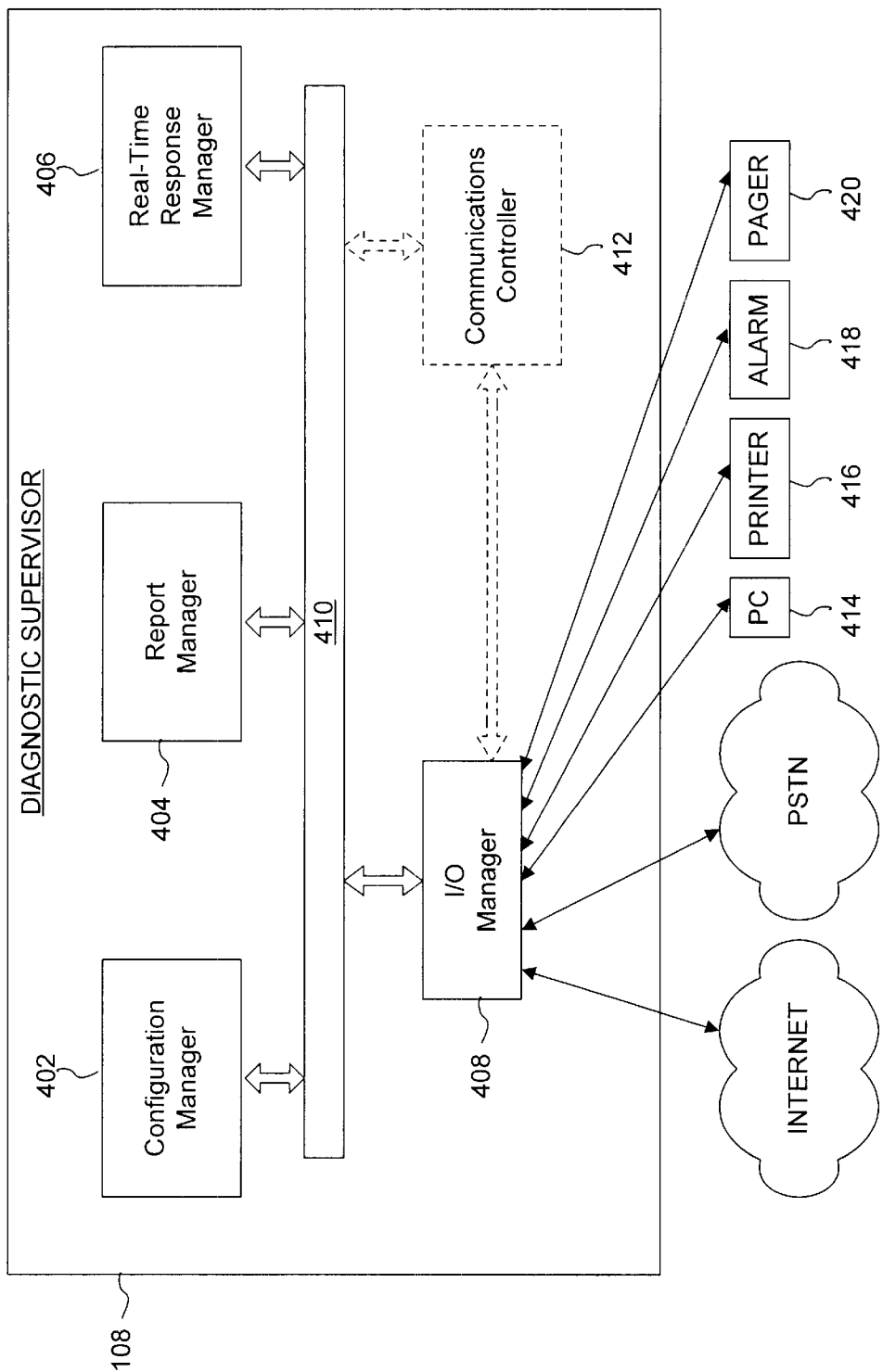
FIG. 4 illustrates an exemplary architecture of a DS according to an embodiment of the present invention.

FIG. 4 illustrates an exemplary architecture for a Diagnostic Supervisor 108, according to the present invention. The Diagnostic Supervisor 108 includes a Configuration Manager 402, a Report Manager 404, a real-time response manager 406, and an Input/Output (I/O) Manager 408. These four managers are interconnected by a bus system 410, which permits the four managers to communicate directly with each other in a flexible manner. Alternatively, direct wiring or busing between each of the four managers can be provided, as would be apparent to a person skilled in the relevant art. The Diagnostic Supervisor 108 can also include an internal or external communication controller 412. The communication controller 412 handles call functions such as call control and VoIP management. The communication controller 412 can be directly coupled to the bus system 410, and thus can be considered an integral part of the Diagnostic Supervisor 108. Alternatively, the communication controller 412 can be external to the Diagnostic Supervisor 108 and be coupled to the Diagnostic Supervisor 108 through the I/O manager 408. Managers 402, 404, 406 and communication controller 412 can communicate via the I/O manger 408 with the Internet 110, and the PSTN 314. Alternate implementations can combine one or more of the managers 402, 404, 406, 408 into one entity.

The Configuration Manager 402 of the Diagnostic Supervisor 108 permits a user or network administrator to configure the diagnostic information to be provided by terminal endpoints before, during or after an Internet connection (e.g., the VoIP call). As will be described in detail below, the Configuration Manager 402 is programmable to provide diagnostic control messages (DCMs) to TEs in order to configure the terminal endpoints (TEs) to provide the desired diagnostic information.

The network administrator can program the Configuration Manager 402 to generate DCMs in a variety of manners. For example, the network administrator can program the Configuration Manager 402 by a personal computer 414 via the Diagnostic Supervisor 108 via the I/O manager 408. Alternatively, the network administrator can program DCMs using the Configuration Manager 402 remotely over an Internet connection, via a telephone link and the PSTN 314, or by a direct connection, such as a serial, parallel, or optical port directly to the Diagnostic Supervisor 108. Such direct (hardwired or wireless) connections are not illustrated in FIG. 4.

The Report Manager 404 receives Diagnostic Messages (DMs) from terminal endpoints configured by DCMs to relay diagnostic information or "events" to the DS 108. DMs are received by the Report Manager 404 via the I/O manager 408 and bus network 410. The DMs can be transmitted from TEs via the Internet 110 or the PSTN 314. In an alternative embodiment of the present invention in which the diagnostic supervisor includes a communication controller 412, the Report Manager 404 can also receive DMs from the communication controller 412. In this alternative embodiment, the communication controller 412 is the equivalent of a terminal endpoint and thus is also configured by DCMs from the Configuration Manager 402 to relay DMs to the Report Manager 404. Thus, the Diagnostic Supervisor 108 receives DMs reflecting its own events.

The Report Manager 404 is programmable to provide reports for the network administrator in a human readable format. For example, reports can be provided by the Report Manager 404 in text form, graphic user interface form via the PC 414, as voice messages, or simply as printouts via a printer 416. Based on the below discussion of diagnostic configuration messages and diagnostic messages, the programming of Report Manager 404 to produce reports for the network administrator would be apparent to a person skilled in the relevant art. Moreover, the Report Manager 404 can be programmed to provide reports to the network administrator, other user or any network device over the Internet 110 or PSTN 314 via the I/O manager 408 and bus network 410.

The Real-Time Response Manager (RTRM) 406 also receives DMs and acts in real-time to perform any necessary response to events. In addition to the various responses provided by the RTRM 406 as described below, it can generate external warnings using devices such as an external alarm 418, pager device 420, or the like, as would be apparent to a person skilled in the relevant art.

Figure 5:
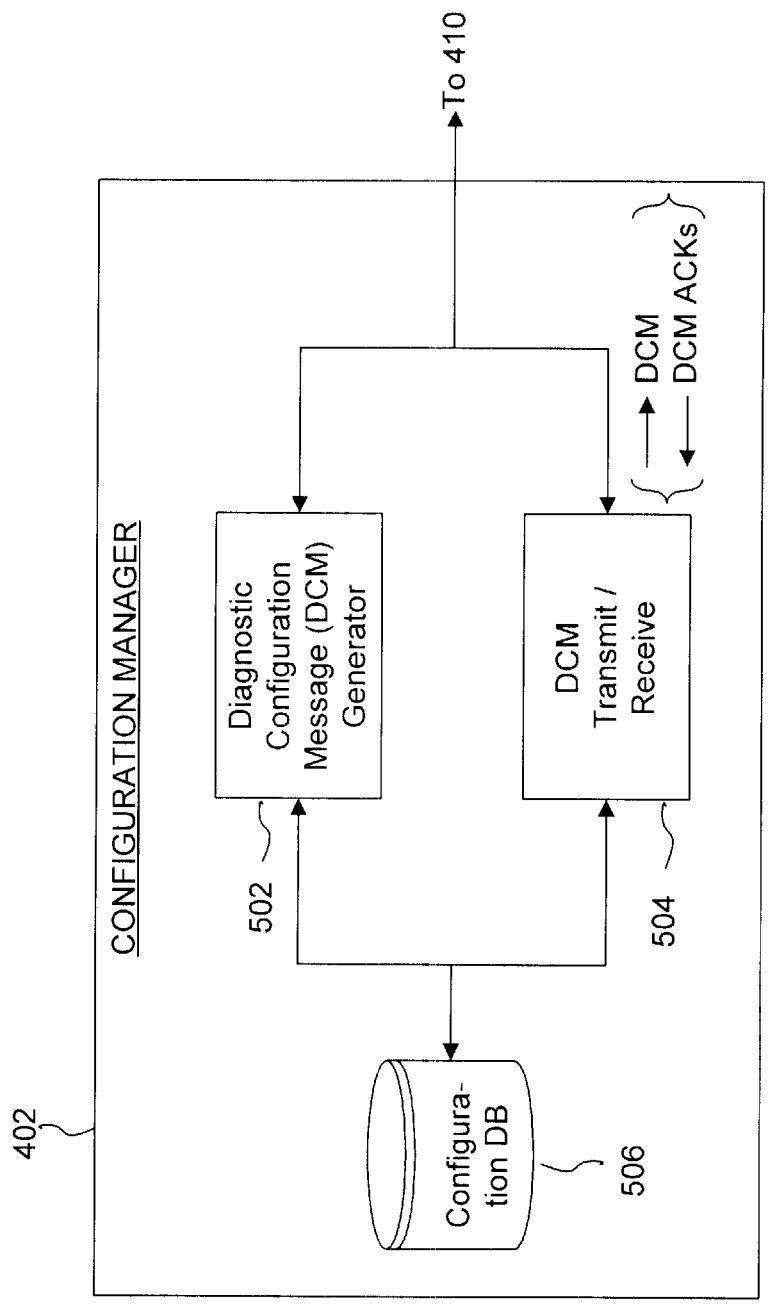
FIG. 5 illustrates an exemplary architecture of a Configuration Manager according to an embodiment of the present invention.

FIG. 5 illustrates an exemplary architecture for the Configuration Manager 402 according to an embodiment of the present invention. The Configuration Manager 402 includes a Diagnostic Configuration Message (DCM) Generator 502, a DCM Transceiver Unit 504 and a configuration database 506. The DCM Generator 502 permits a network administrator to create DCMs in order to configure TEs.

An example of a DCM is an information element (IE) having a format illustrated below in Table 1. Column (a) of Table 1 is the Field Number that lists the sequential number of information fields in the IE. Column (b) is the Field Length (octet) that gives the length in eight bit octets of each information field. Column (c) is the Information Field Name that lists the name of each information field used in the IE. Column (d) is the Information Field Description that describes the function, format and purpose of each information field in the IE. The last column (e) is the Format and Value that defines the value or data format used in each information field. Unless noted otherwise in the field description, the data format used in each information field is an unsigned hexadecimal value. If the information field is composed of more than one octet, the first octet is the most significant byte and the last octet is the least significant byte. The diagnostic parameters of the DCM for QoS, for example, are delivered in a Q.931/H.225.0 "like" block messages. The DMs described below are also delivered through Q.931/H.225.0 "like" block messages. The DM message formats are described below in connection with Table 2.

TABLE 1

DCM IE Format

| Field Num. (a) | Field Length (octet) (b) | Information Field Name (c) | Information Field Description (d) | Format and Value (e) |
|---|---|---|---|---|
| 1 | 1 | QOS_TRAP_IE (1) | This is the information element identifier field for the DCM (QOS_DIAGNOTICE_IE). This is a fixed length information element. | 0xXX |
| 2 | 2 | IE_Length | This field defines the length of the "contents" of the information element. | Hex |
| 3 | 1 | MODE | This field is bit mapped. This first bit turns on and off auto reporting. The second bit provides for a one time report in | Hex |

TABLE 1-continued

DCM IE Format

| Field Num. (a) | Field Length (octet) (b) | Information Field Name (c) | Information Field Description (d) | Format and Value (e) |
|---|---|---|---|---|
| | | | response to each QOS_TRAP_IE received.<br>1st Bit: "1" Auto Reporting on<br>"0" Auto Reporting off<br>2nd Bit: "1" One time response on<br>"0" One time response off | |
| 4 | 2 | SOURCE | This field provides the address of the TE that is being configured for auto-reporting of diagnostic information. | Hex |
| 5 | 1 | DESTINATION | This field tells the TE were to send the diagnostic reports. The last type octets define the IP address. The first byte is bit mapped. When each bit is set to "1" the diagnostic report is send to the location defined as follows:<br>1st bit    Communications controller<br>2nd bit    far end party<br>3rd bit    far end party and all conference partners<br>4th bit    Diagnostic TSAP 1 defined below<br>5th bit    Diagnostic TSAP 2 defined below | Hex |
| 6 | 2 | DESTINATION 1_TSAP | This field defines the IP address and port where the diagnostic messages are sent. | Hex |
| 7 | 2 | DESTINATION 2_TSAP | This field defines the IP address and port where the diagnostic messages are sent. | Hex |
| 8 | 1 | LOST_PACKETS_TRAP | This field defines the value at which the percentage of lost packets will cause a diagnostic report to be sent. The period of time over which the percentage of lost packets is calculated is defined below. | Hex |
| 9 | 2 | LOST_PACKETS_TIME | This field defines the time period in seconds over which the percentage of lost packet is calculated. During a call, the percentage of lost packet is calculated over consecutive time intervals until the completion of the call. | Hex |
| 10 | 1 | SILENCE_PACKETS_TRAP | This field defines the value at which the percentage of silence packets will cause a diagnostic report to be sent. The period of time over which the percentage of lost packets is calculated is defined below.<br>Note: This trap can be used to perform disconnect supervision when an IP/Voice gateway is bridged to a PSTN station, trunk, or service that does not provide disconnect supervision. | Hex |
| 11 | 2 | SILENCE_PACKETS_TIME | This field defines the time period in seconds over which the percentage of silence packets is calculated. During a call, the percentage of silence packets is calculated over consecutive time intervals until the completion of the call. | Hex |
| 12 | 1 | NON_SILENCE_PACKETS | This field defines the value at which the percentage of non-silence packets will cause a diagnostic report to be sent. The period of time over which the percentage of lost packets is calculated is defined below.<br>Note: This trap can be used to perform answer detection when a IP/VOICE gateway is connected to a PSTN station or trunk or service that does not support answer detection. | Hex |
| 13 | 1 | NON_SILENCE_PACKETS_TIME | This field defines the time period in seconds over which the percentage of non-silence packets is calculated. During a call, the percentage silence packets is calculated over consecutive time intervals until the completion of the call. | Hex |
| 14 | 2 | AVG_JITTER_TRAP | This field defines the value at which the average packet jitter will cause a diagnostic report to be sent. The period of time over which the average packet jitter is calculated is defined below. | Hex |
| 15 | 2 | AVG_JITTER_TIMER | This field defines the time in units of seconds over which the jitter average is calculated. | Hex |
| 16 | 2 | INVALID_HEADER | This field defines the value at which the number of packets with invalids will cause headers a diagnostic message to be sent by the TE. The period of time over which the total number of invalid headers is counted is defined below. | Hex |
| 17 | 2 | INVALID_HEADER_TIMER | This field defines the time in units of seconds over which the invalid header count is maintained. | Hex |
| 18 | 1 | IDLE_PACKET_TRAP | This field defines the value at which the percentage of idle packets will cause a diagnostic report to be sent. The period of time over which the percentage of idle packets is calculated is defined below. | Hex |
| 19 | 2 | IDLE_PACKET_TIMER | This field defines the time period in seconds over which the percentage of idle packets is calculated. During a call, the percentage of silence packets is calculated over consecutive time intervals until the completion of the call. | Hex |

TABLE 1-continued

DCM IE Format

| Field Num. (a) | Field Length (octet) (b) | Information Field Name (c) | Information Field Description (d) | Format and Value (e) |
|---|---|---|---|---|
| 20 | 1 | REPLAY_PACKET_TRAP | This field defines the value at which the percentage of replay packets will cause a diagnostic report to be sent. The period of time over which the percentage of idle packets is calculated is defined below. | Hex |
| 21 | 2 | REPLAY_PACKET_TIMER | This field defines the time period in seconds over which the percentage of idle packets is calculated. During a call, the percentage of silence packets is calculated over consecutive time intervals until the completion of the call. | Hex |
| 22 | 2 | MAX_JITTER_TRAP | This field defines the value at which the peak packet jitter will cause a diagnostic report to be sent. The period of time over which the peak packet jitter is calculated is defined below. | Hex |
| 23 | 2 | MAX_JITTER_TIMER | This field defines the time in units of seconds over which the maximum jitter is calculated. | Hex |

The DCM generator 502 transmits DCMs via the DCM transceiver unit 504. The DCMs are sent to one or more TEs and are stacked inside the use-to-user information element (UUIE) attached to the Q.931/H.225.0 setup message or alerting message. The purpose of the UUIE is to convey information between Q.931/H.225.0 users (in this case the Diagnostic Supervisor 108 and TEs). The DCM conveyed in the UUIE is not interpreted by the network, but rather is carried transparently and delivered to the remote TEs. The specific coding of a UUIE is fully described in section 4.5.30 of the International Telecommunication Union (ITU) Telecommunication Standardization Sector (ITU-T) Recommendation Q.931, which was approved by the World Telecommunication Standardization Conference (WTSC) in Helsinki on Mar. 1–12, 1993. The implementation details of transporting information via the UUIE therefore would be apparent to a person skilled in the relevant art.

The DCMs configure the TEs to provide DMs back to the Diagnostic Supervisor 108. This configuration permits the TEs to provide a variety of diagnostic parameters that give real time information about the quality of the inbound and outbound voice, modem, facsimile, video or data streams for a given IP connection. This diagnostic information can be polled (i.e., requested) by the communications controller 412 of a combined DS/TE or from any TE participating in an IP connection. In addition to polling, the diagnostics can be automatically delivered to the DS or any participating DS/TE or TE. This automatic delivery of diagnostics is provided based on parameters contained in the DCMs which are generated by the Configuration Manager 402.

The configuration database 506 can be used by the DCM generator 502 or network administrator to store various different of configurations. For example, configuration database 506 can store logs of transmitted DCMs, including, for example, a copy of the DCMs, a list of the target TEs and time and date information. The configuration database 506 can also store DCM acknowledgments received by the DCM Transceiver 504 from recipient TEs or from the communication controller 412.

Turning again to Table 1, various features of the DCM information element (IE) format will be explained. The DCM, can be in the format of a Q.931/H.225.0 block message. The first field in the DCM is the information element identifier. Appended to the information element identifier are information elements labeled field numbers 2–23. Field number 2 represents the length of the DCM information element. Field number 3 is the Mode Information field, which is a bit mapped byte. One bit turns off auto reporting. The second bit provides for a one time report as a compelled response to DCM IE. Field number 4 is the Source Information field, which provides the address of the IP-Board of the TE that is being configured for auto-reporting of diagnostic information.

Field number 5 is the Destination Information field, which tells the IP-Board where to send the DM. For example, when the first bit it set to "1" the DM sent to the local communication controller 412 (where the IP-Board would typically reside) and the Report Manager 404. If the second bit is set to "1" the DM is sent to the far end party. Setting bits 3 to 5 yields the functionality listed in Table 2, field number 5, column (d).

Remaining field numbers 8–23 represent example parameters that a TE can be configured to trap. In other words, a TE is configured by the DCM to keep track of certain parameters and relay them according to the configuration specified by the DCM in field numbers 5–23. For example, field number 8 lists the LOST_PACKETS_TRAP information field. This field defines the value at which the percentage of lost packets will cause a DM to be sent. The period of time over which the percentage of lost packets is calculated is defined in field number 9, which is the LOST_PACKETS_TIME information field.

Similarly, a silent packet trap is defined by fields 10 and 11 and a non-silent packets trap is defined in field numbers 12–13. An average jitter trap is defined in field numbers 14 and 15. An invalid header trap is defined in field numbers 16 and 17. An IDLE_PACKET_TRAP is defined in field numbers 18 and 19. A REPLAY_PACKET_TRAP is defined in fields 20–21 and a maximum jitter trap is defined in field numbers 22 and 23.

Once configured, a TE is then capable of responding to DCMs by transmitting DMs to the destination or destinations specified in field numbers 5–7 of the IE corresponding to the DCM as described above. Table 2 lists an exemplary information element format for a Diagnostic Messages (DM) according to the present invention. As with DCMs, DMs are defined in a set of Q.931/H.225.0 "like" information elements. The DMIE can be stacked inside the UUIE when transmitted over a H.323 network. Column (a) of Table 2 lists the sequential number of information fields in the IE. Column (b) lists the length in eight bit octets of each information field. Column (c) lists the name of each information field used in the IE. Column (d) describes the function, format and purpose of each information field in the IE. The last column (e) defines the value or data format used in each information field. Unless noted otherwise in the field description, the data format used in each information field is an unassigned hexadecimal value. If the information field is composed of more than one octet, the first octet is the most significant byte and the last octet is the least significant byte.

TABLE 2

DM IE Format

| Field Num. (a) | Field Length (octet) (b) | Information Field Name (c) | Information Field Description (d) | Format and Value (e) |
|---|---|---|---|---|
| 1 | 1 | QOS_DIAGNOSTIC_IE (1) | This is the information element identifier field for the DM (QOS_DIAGNOSTICE_IE). This is a fixed length information element. | 0xXX |
| 2 | 2 | IE_Length | This octet defines the length of the "content" of the information element. | Hex |
| 3 | 2 | Call Reference | This is the call reference field. This 2 octet field identifies the call from which the diagnostic information is provided. For multiparty conferences, each party may have a different call reference value. | Hex |
| 4 | 2 | Conference ID | For multi-party conference calls, this 2 octet field identifies the conference number. | Hex |
| 5 | 2 | Source | This field identifies the IP address of the TE that is sending the QOS diagnostic information element. This field may be set to 0x0000 when the IE is being sent over communications controller and represent the local TE. This field may be set to 0xFFFF when the IE is being sent over the communications controller and the represents the far-end party in a two party call. | Hex |
| 6 | 1 | Media_Type | This field defines the media type being processed by the TE that sends the diagnostic message. The values for this field are defined as follows:<br>Value  Media<br><br>1  Voice<br>1  FAX-Relay<br>2  Modem<br>3  Video<br>4  Data | Hex |
| 7 | 2 | DIAG_TIME_PERIOD | This field defines the period of time in seconds over which diagnostic information is collected. If the value is 0xFFFF, diagnostic information is collected over the entire length of the call. | Hex |
| 8 | 1 | TRAP_ACTIVE1 | This is a bit mapped octet were a bit corresponds to a set of trap conditions. If a trap condition is satisfied, the bit is set to "1". The trap conditions are programmed for each TE through the IE summarized in the next table. If no trap condition is met, the bit is set to "0". The bit map is summarized below:<br>BIT  Trap Description<br><br>1st  Lost packet trap<br>2nd  Silence packet trap<br>3rd  Non silence packet trap<br>4th  Average jitter trap<br>5th  Invalid header trap<br>6th  IdIe packet trap<br>7th  Replay packet trap<br>8th  Maximum jitter trap | Hex |
| 9 | 1 | TRAP_ACTIVE2 | This field is reserved for future trap diagnostics. | Hex |
| 10 | 2 | RX_PACKET_SIZE | This field defines the average packet length of received packets. | Hex |
| 11 | 4 | RX_PACKETS | This field defines the total number of received packets. | Hex |
| 12 | 2 | LOST_PACKETS | This counter keeps track of the number of packets not received. | Hex |
| 13 | 2 | SILENCE_PACKETS | This counter keeps track of the number of packets that contain silence information descriptors (SID). | Hex |
| 14 | 2 | IDLE_PACKETS | When an inbound packet is lost, one method for filling in the lost packet is to create a "pink" noise packet. This pink noise packet is referred to as an IDLE packet. This counter keeps track of the number of times a lost packet is replaced with a pink noise packet. | Hex |

TABLE 2-continued

DM IE Format

| Field Num. (a) | Field Length (octet) (b) | Information Field Name (c) | Information Field Description (d) | Format and Value (e) |
|---|---|---|---|---|
| 15 | 2 | REPLAYED_PACKETS | When an inbound packet is lost, one method for filling in the lost packet is to replay the previous packet. This counter keeps track of the number of times a packet is replayed to fill in a lost packet. | Hex |
| 16 | 2 | DROPPED_PACKETS | Some packets arc received but they come too late to fit into the jitter buffer. This counter keeps track of the number of packets that come too late to fit into the jitter buffer. | Hex |
| 17 | 2 | PLAYOUT_DELAY | This parameter provides the average delay in the voice play out unit FIFO in ms. | Hex |
| 18 | 2 | MIN_JITTER | This parameter gives the minimum packet interarrival time in ms. | Hex |
| 19 | 2 | MAX_JITTER | This parameter gives the maximum packet interarrival time in ms. | Hex |
| 20 | 2 | INVALID_HEADER | This parameter provides the number of incoming packets with invalid headers. | Hex |
| 21 | 2 | MICRO_OVERFLOW | This parameter provides the number of transmit voice packets dropped due to buffer overflow. | Hex |

As with the DCM information element format as discussed above in connection with Table 1, the DM element format, of Table 2 is similar to a Q.931/H.255.0 block message. The first component in field number 1 is the information element Identifier field for the diagnostic message IE. Field number 2 is the Length of the DM information element in octets. Field number 3 is the Call Reference information field, which is a two octet field identifying the call (IP connection) from which the diagnostic information is provided. For multi-party conferences, each party can have a different call reference value. Field number 4 is the Conference ID information field, which identifies the conference number for multi-party IP connections. Field number 5 is the Source information field. This field identifies the IP address of the TE that is sending the QoS diagnostic information element (i.e., the TE transmitting the DM).

A Media Type information field is illustrated in field number 6 of Table 2. This field determines the type of media being processed by the TE that sends the DM. The values for this field are specified in field 6 of Table 2 according to whether the media is voice, modem, facsimile, video or data.

Field number 7 is the diagnostic time period (DIAG_TIME_Period) of the trap condition that caused the sending of the DM. If the value is xFFFF, for example, diagnostic information was collected over the entire length of the IP connection. Field number 8 is the Trap Active 1 information field. This is a bit mapped octet in which each bit corresponds to a condition. If a trap condition is satisfied, the bit is set to "1". The trap conditions are programmed for each TE through the information element summarized in the "BIT" table listed in the information field description of field number 8 in Table 2. The trap descriptions for the Trap Active 1 information field includes: loss packets, silent packets, non-silence packets, average jitter, invalid header, idle packets, replay packets, and maximum jitter.

Field number 9 is the Trap Active 2 information field, which is reserved for future Trap diagnostics. Fields 10 through 21 corresponds to various QoS parameters.

Figure 6:
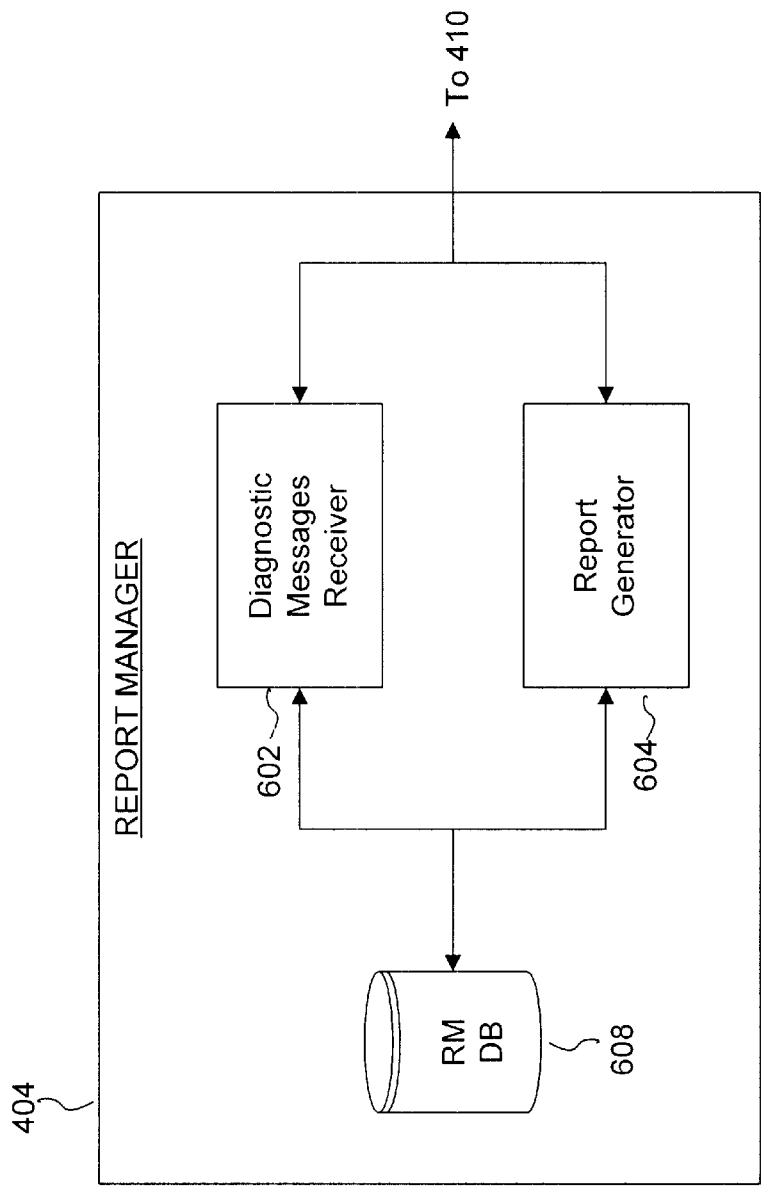
FIG. 6 illustrates an exemplary architecture of a Report Manager according to an embodiment of the present invention.

FIG. 6 illustrates an exemplary architecture for the Report Manager (RM) 404 according to the present invention. Report Manager 404 includes a diagnostic messages receiver 602, a Report Generator 604 and a IRM database 608. The DM receiver 602 receives DMs from TEs or a communications controller, such as communication controller 412. DMs accepted by the DM Receiver 602 are stored in the RM database 608. The Report Generator 604 retrieves received DMs from the RM database 608 and formats reports for a user or the network administrator in a human readable fashion. The Report Generator 604 is programmable to facilitate many report formats. Reports can be generated by Report Generator 604 and presented to the network administrator using the PC 414 or a printer 416. Alternatively, diagnostic message reports can be accessed via the Internet 110 or PSTN 314 via I/O manager 408 and the bus 410. Reports can be generated on a TE basis, a client basis, a server basis or on a partition basis if the communications network supported by the DS 108 is partitioned. Reports can be provided by the Report Manager 404 on a automatic or on a query basis.

Figure 7:
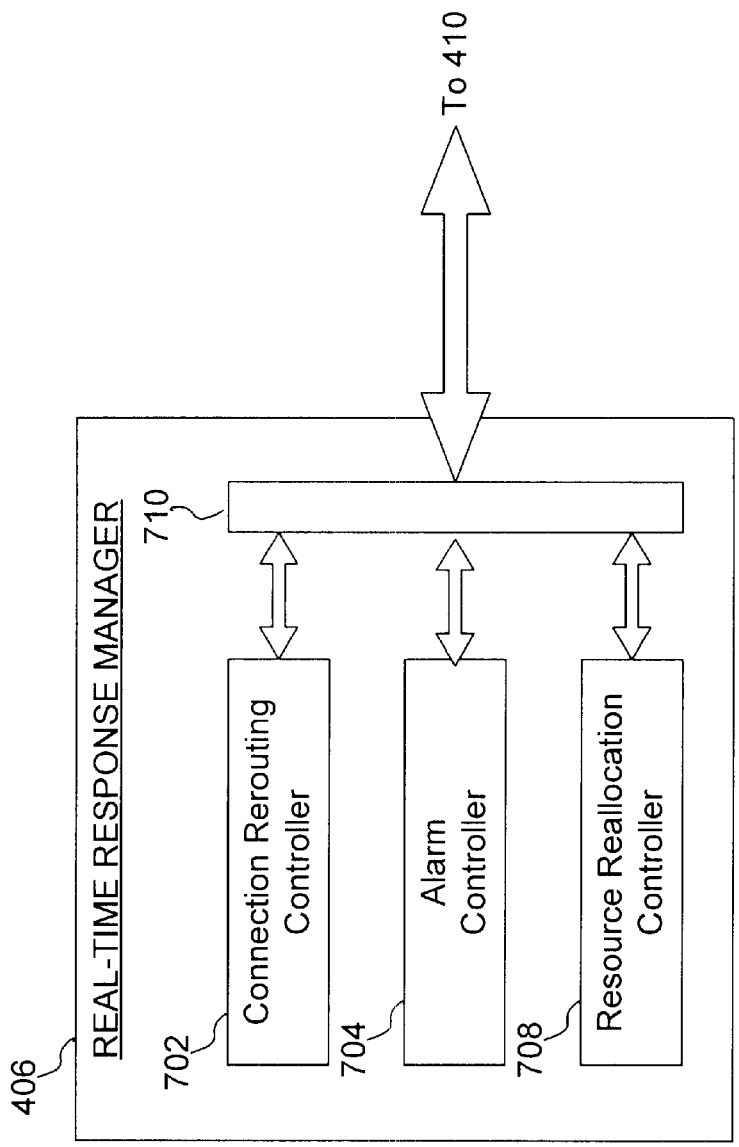
FIG. 7 illustrates an exemplary architecture of a Real-Time Response Manager (RTRM) according to an embodiment of thee present invention.

FIG. 7 illustrates an exemplary architecture for the real-time response manager (RTRM) 406 according to the present invention. The RTRM 406 includes a connection Rerouting Controller 702, an Alarm Controller 704, a Resource Reallocation Controller 708 and a Bus System 710. Bus System 710 permits elements 702, 704 and 708 to communicate with each other, as well as communicate with elements external to the RTRM 406 via the bus 410.

Figure 9:
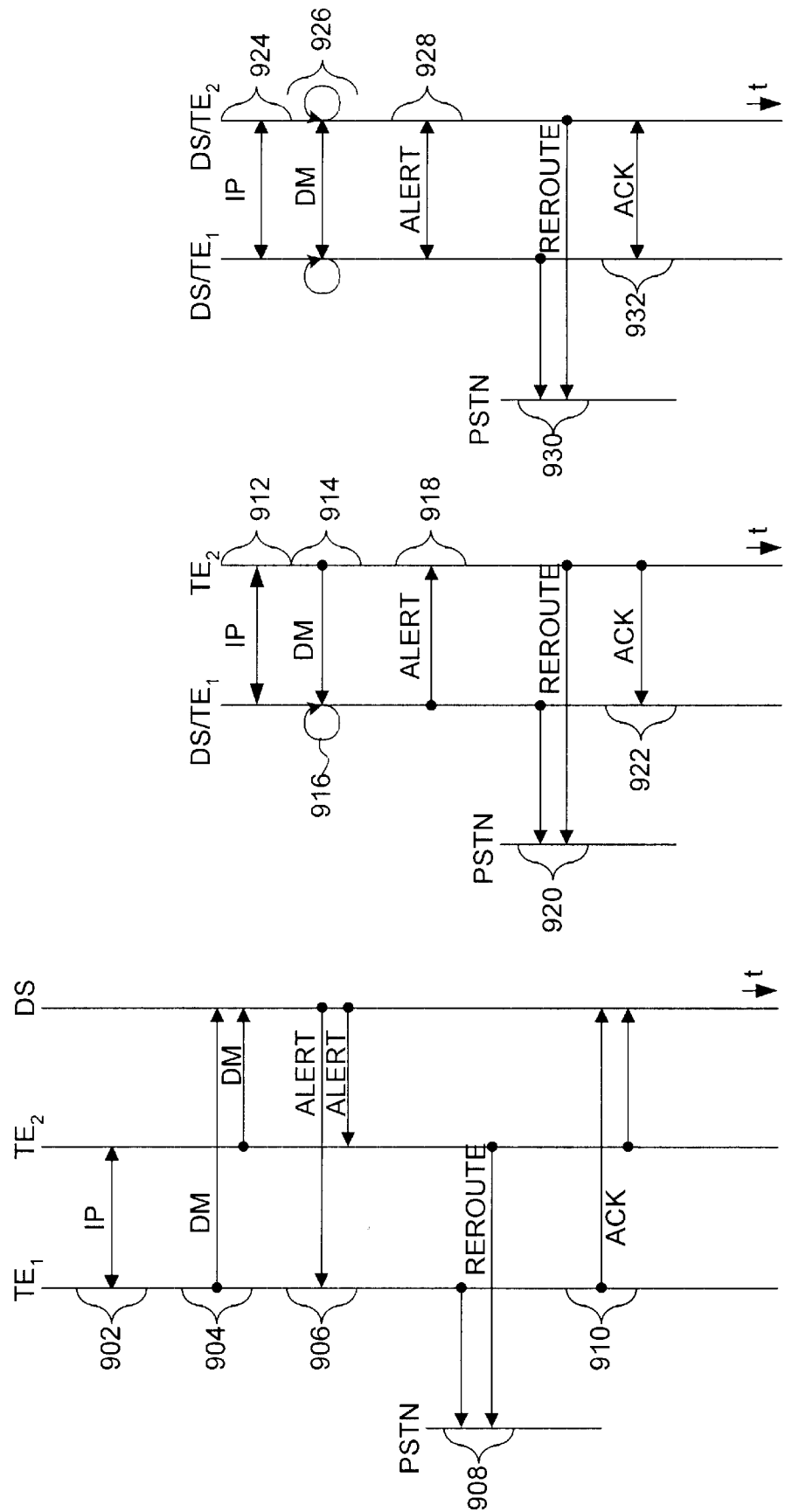
FIGS. 9A–C illustrate exemplary flow diagrams for IP connection rerouting to the PSTN according to the present invention.

A feature of the RTRM 406 according to the present invention is to respond to diagnostic messages by rerouting Internet connections to the PSTN 314. The decision to reroute connections (e.g., VoIP calls) can be made by the RTRM 406, or by TEs comprising distributed call routing functionality as described in detail below in connection with FIG. 9. Parameters that can cause rerouting of a connection (including but are not limited to voice, modem, facsimile, data or video connections) are: prioritization, parameter limit concerns, malfunctioning codecs, or the like.

The Alarm Controller 704 provides external alarming of a user via the alarm 418 for example, or notifications to other network devices such as TEs, distributed DSs, servers, clients, PCs, IP-phones, or the like.

The Resource Reallocation Controller 708 also responds to diagnostic information provided by DMs. The Resource Reallocation Controller 708 can adjust parameter thresholds by passing necessary adjustment information to the Configuration Manager 402, which in turn provides DCMs to TEs to thereby modify the trapping of various parameters based on the new threshold value(s). Controller 708 is capable of creating new diagnostics or disabling existing diagnostics monitored by the TEs. Controller 708 also provides transient filtering of diagnostic information to adjust thresholds, create new diagnostics or disable existing diagnostics. Moreover, the controller 708 can simply disable or enable network resources or devices such as TEs, or the like.

Figure 8:
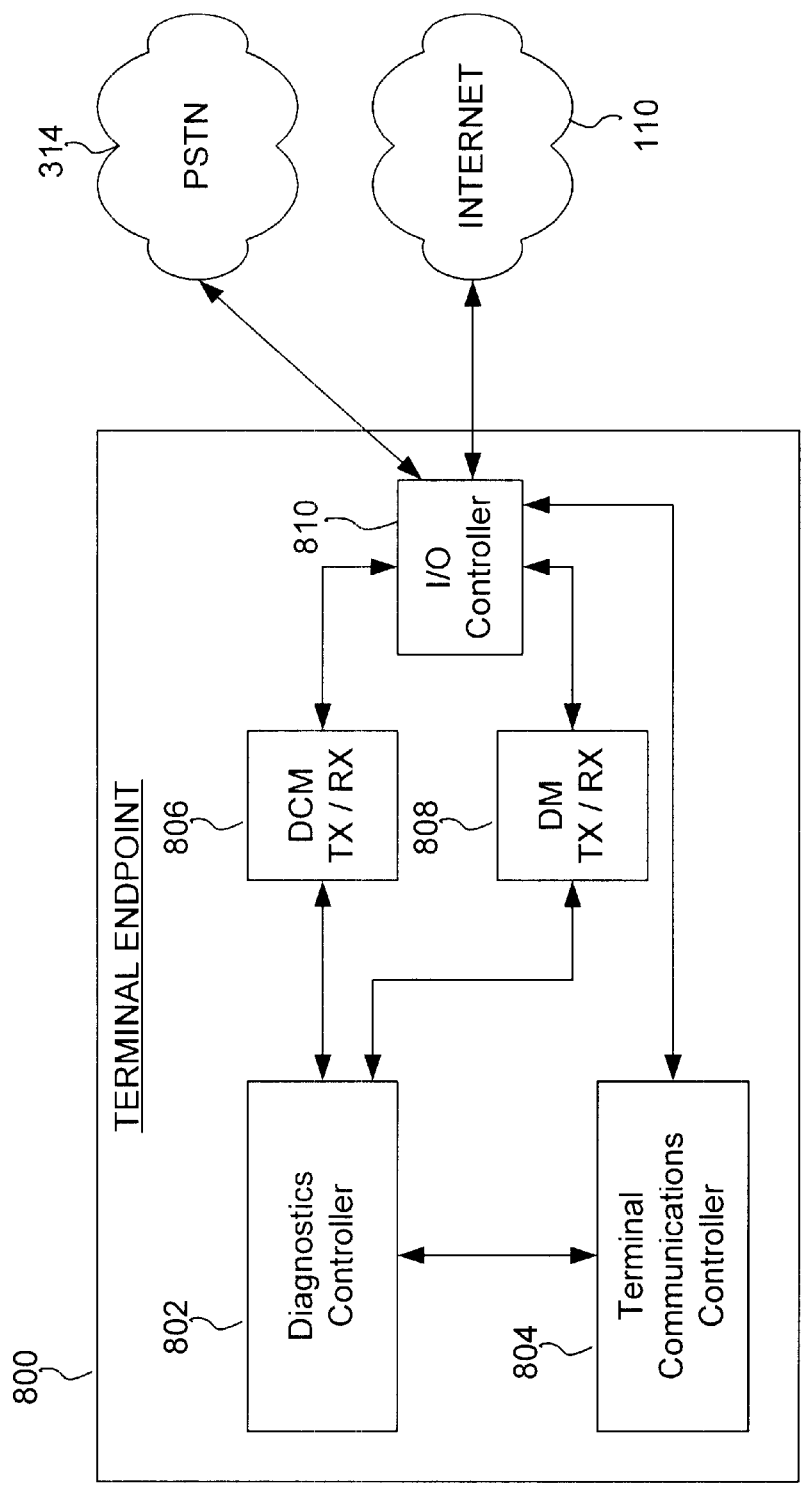
FIG. 8 illustrates an exemplary architecture of a TE according to an embodiment of the present invention.

FIG. 8 illustrates an exemplary architecture for a terminal endpoint (TE) 800 according to the present invention. TE 800 includes a Diagnostics Controller 802, a Terminal Communications Controller 804, a DCM Transceiver 806, a DM Transceiver 808, and an I/O Controller 810.

The Diagnostics Controller 802 receives and transmits DCMs via DCM Transceiver 806. The Diagnostics Controller 802 is configured using DCMs received from one or more Diagnostic Supervisor 108. The Diagnostics Controller 802 monitors IP and PSTN connections by communicating with the Terminal Communications Controller 804. The Diagnostics Controller 802 receives diagnostic information regarding IP connections from a network manager module (not shown), such as that provided by Telogy Networks and described by GOLDEN GATEWAY® Interface, User Guide Version 2.5 for Release 5.1 (Telogy Networks, Germantown, Md.).

The Diagnostics Controller 802 formats DMs to be transmitted to the Diagnostic Supervisor 108 according to the information element format described above in connection with Table 2. The setting of parameters and transmission of DMs is determined by the Diagnostics Controller 802 according to DCMs received by the DS 108, according to the information element format described above in connection with Table 1. The DM Transceiver 808 transfers DMs prepared by Diagnostics Controller 802 to one or more DSs 108 or other TEs. Additionally, DM Transceiver 808 receives DMs from other TEs in the event that the TE 800 includes distributed DS functionality or can otherwise act on DM information from a far end IP or PSTN connection. DCMs and DMs are transmitted and received via the I/O Controller 810 to/from the Internet 110 or PSTN 314.

The Terminal Communications Controller 804 of the terminal end point 800 performs voice, modem, facsimile, video and data connections with other TEs connected to either the Internet 110 or PSTN 314, as would be apparent to a person skilled in the relevant art. An example communication protocol stack used by the Terminal Communication Controller 804 is the H.323 Protocol Stack manufactured by RADVision Inc. (Mahwah, N.J.).

As discussed above, providing diagnostic information concerning TEs IP and/or PSTN connections is very useful. For example, an Internet connection, such as a VoIP call, can be rerouted from the Internet to the PSTN for a variety of reasons, some of which are triggered by diagnostic information. FIGS. 9A–9C illustrate exemplary flow diagrams of IP connection routing to the PSTN according to the present invention. The progress of connections between communication devices illustrated in these diagrams advances in time from top to bottom, as shown at the arrows labeled "t".

FIG. 9A illustrates rerouting of an IP connection between terminal endpoints TE1 and TE2. The IP connection, such as a VoIP call, between TE1 and TE2 is shown generally at 902. During their IP connection either TE1 and/or TE2 will send Diagnostic Messages (DM) to the Diagnostic Supervisor (DS) as shown generally at 904. Diagnostic information can also be sent before and after the connection is established. In this embodiment, the DS will evaluate the diagnostic information provided by the DMs and determine whether or not to reroute the IP connection between TE1 and TE2 from the Internet to the PSTN. If the DS determines that rerouting is necessary, the DS will send an alert to both TEs, as shown generally at 906. Beeps or other notification can be provided to the user to audibly alert that the connection will be rerouted to the PSTN. The communications controllers of both TEs will then handle rerouting of the call from the Internet to the PSTN, as shown generally at 908. Once rerouting is completed, the TEs will transmit reroute acknowledge signals (ACK) or not acknowledge (NACK) signals back to the Diagnostic Supervisor 168 indicating whether or not the rerouting to the PSTN was successful, as shown generally at 910.

FIG. 9B illustrates an alternative embodiment of the present invention for rerouting IP connections to the PSTN. In this embodiment, TE1 also has diagnostic supervision functionality. An IP connection over the Internet between DS/TE1 and TE2 is shown generally at 912. TE2 transmits DMs to DS/TE2 during the IP connection, as shown generally at 914. DS\TE1 also will internally monitor diagnostic information at its end of the IP connection, as shown generally at 916. If DS\TE1 determines that rerouting is necessary it will send an alert to TE2, as shown generally at 918. The IP connection will then be rerouted to the PSTN as shown generally at 920. An ACK or NACK signal will be sent by TE2 to verify whether or not the rerouting was effective on its end of the connection, as shown generally at 922.

FIG. 9C shows yet another alternative embodiment for rerouting IP connections to the PSTN. In this embodiment, both TE1 and TE2 have diagnostic supervision capabilities. An IP connection between DS\TE1 and DS\TE2 is shown generally at 924. The two DS/TEs transmit DMs to each other during the IP connection, as shown generally at 926. An alert will be sent by DS\TE1 or DS\TE2 in the event that a determination to reroute tire IP connection has been made, as shown generally at 928. Rerouting of the connection to the PSTN and acknowledgment are shown at 930 and 932, respectfully. In this embodiment a user can initiate rerouting to switch to the PSTN for any reason.

Figure 10:
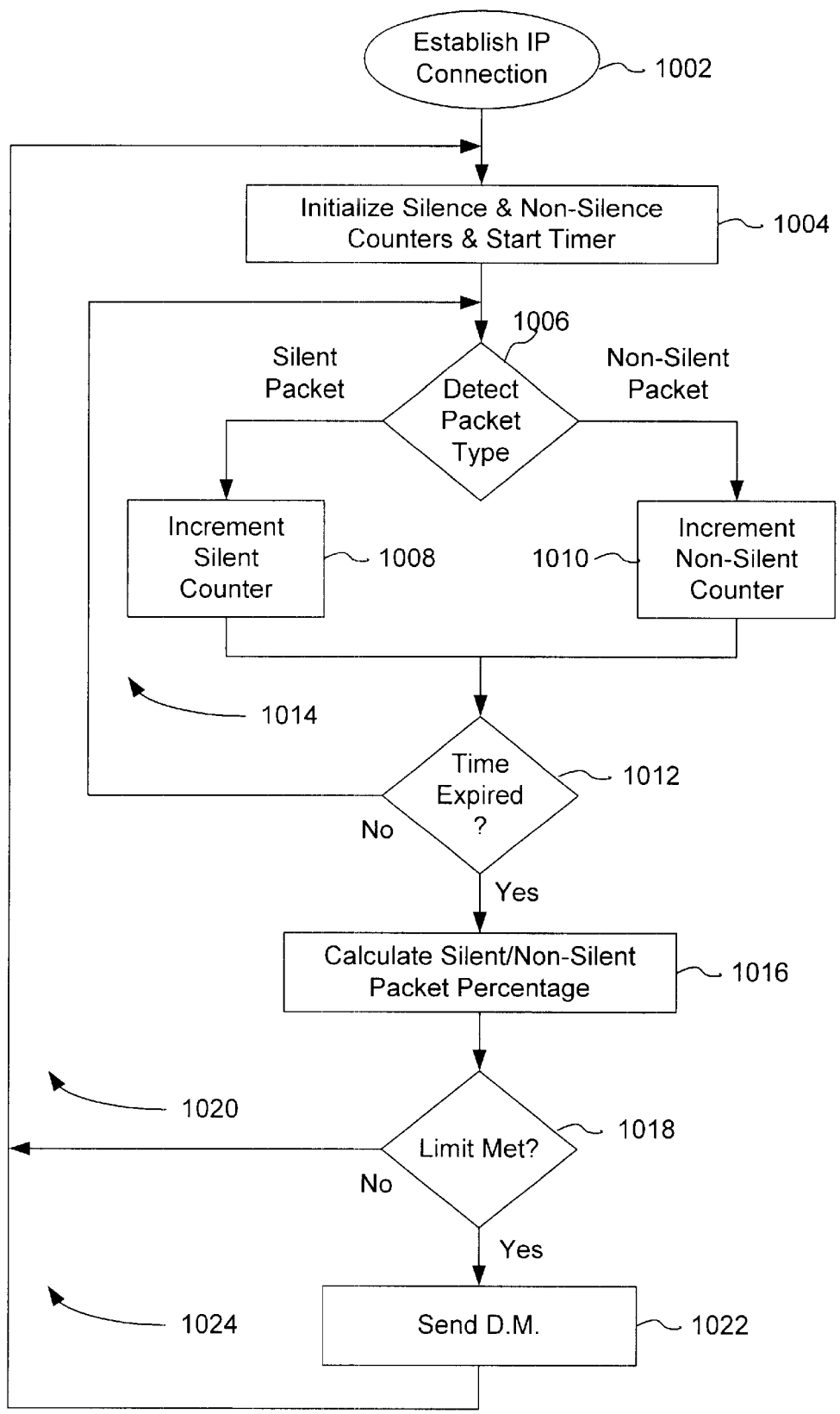
FIG. 10 illustrates an exemplary flow diagram for disconnect supervision or answer detection of IP connections according two embodiments of the present invention.

FIG. 10 illustrates an exemplary flow diagram for disconnect supervision and answer detection of IP connections according to embodiments of the present invention. As would be apparent to those skilled in the relevant art, disconnect supervision and answer detection are useful functions in communications systems. The adaption of disconnect supervision and answer detection in an IP connection environment will provide these features where they otherwise are not supported.

VoIP wrappers provide headers that specify whether the data portion of the packet is empty or not. If the data portion is empty, the packet is considered a silent packet. Non-silent packets followed by many silent packets may indicate the call has effectively terminated, perhaps abnormally. Thus, detection of silent packets can indicate that the call should be automatically disconnected. Many silent packets followed by non-silent packets can indicate the call has been answered. As listed above in Tables 1 and 2, the DCM and DM protocols support configuration of and reporting of diagnostic information concerning silent and non silent packets. The reporting of silent packets can be used to implement disconnect supervision in an IP/PSTN gateway connection environment. In a similar fashion, the detection of non silent packets can be used to implement answer detection in an IP/PSTN gateway connection.

According to the present invention, silent and non-silent detection can occur once an IP connection is established between two or more TEs, as shown at a step 1002. A silence counter and non-silence counter, as well as a start timer, are initialized at a step 1004. Detection of either silent packets or non-silent packets is performed at a step 1006. If a silent packet is detected, the silent counter is incremented, as shown at a step 1008. Similarly, if a non-silent packet is detected, the non-silent counter is implemented at a step 1010. If a predetermined limit of the timer has not expired, as detected at a step 1012, silent and non-silent packet detection is continued, as shown generally at a loop 1014. If the timer limit has expired, the silent packet percentage or non-silent package percentage is calculated at a step 1016.

Predetermined limits for non-packet percentage and non-silent-packet percentage are set a priori by a DCM in order to determine, in the case of the silent packet percentage limit, whether a disconnection has occurred. Alternatively, if the predetermined non-silent packet percentage limit has been met, then answer detection has been determined. These limits are checked at a step 1018. If a limit is not met and the timer period has expired, the counters and start timer are reinitialized and the detection process continues, as shown generally at a loop 1020. If a limit has been met, the TE detecting the limit will send a DM to the Diagnostic Supervisor (DS), as shown at a step 1022. The detection process will then continue as shown generally at a loop 1024.

Calculating the percentage of total packets is a straight-forward process. Total percentage of silent packets is simply the total number of silent packets divided by the sum of the total number of silent and non-silent packets. Similarly, the percentage of non-silent packets is the total number of non-silent packets divided by the sum of the total number of silent packets and non-silent packets. Rather than calculating the average packet count, the process can be simplified by simply counting the total number of silent or non-silent packets over a finite period of time.

In an alternative embodiment of the present invention, DCM configuration information can be preprogrammed at installation. In this manner TEs are hard-coded to transmit DMs that include diagnostic information of parameters without the need to be actively configured by DCMs. For example, TEs would automatically (e.g., at predetermined time intervals) transmit DMs with silent and non-silent diagnostic information during all or only preprogrammed types of connections.

Figure 11:
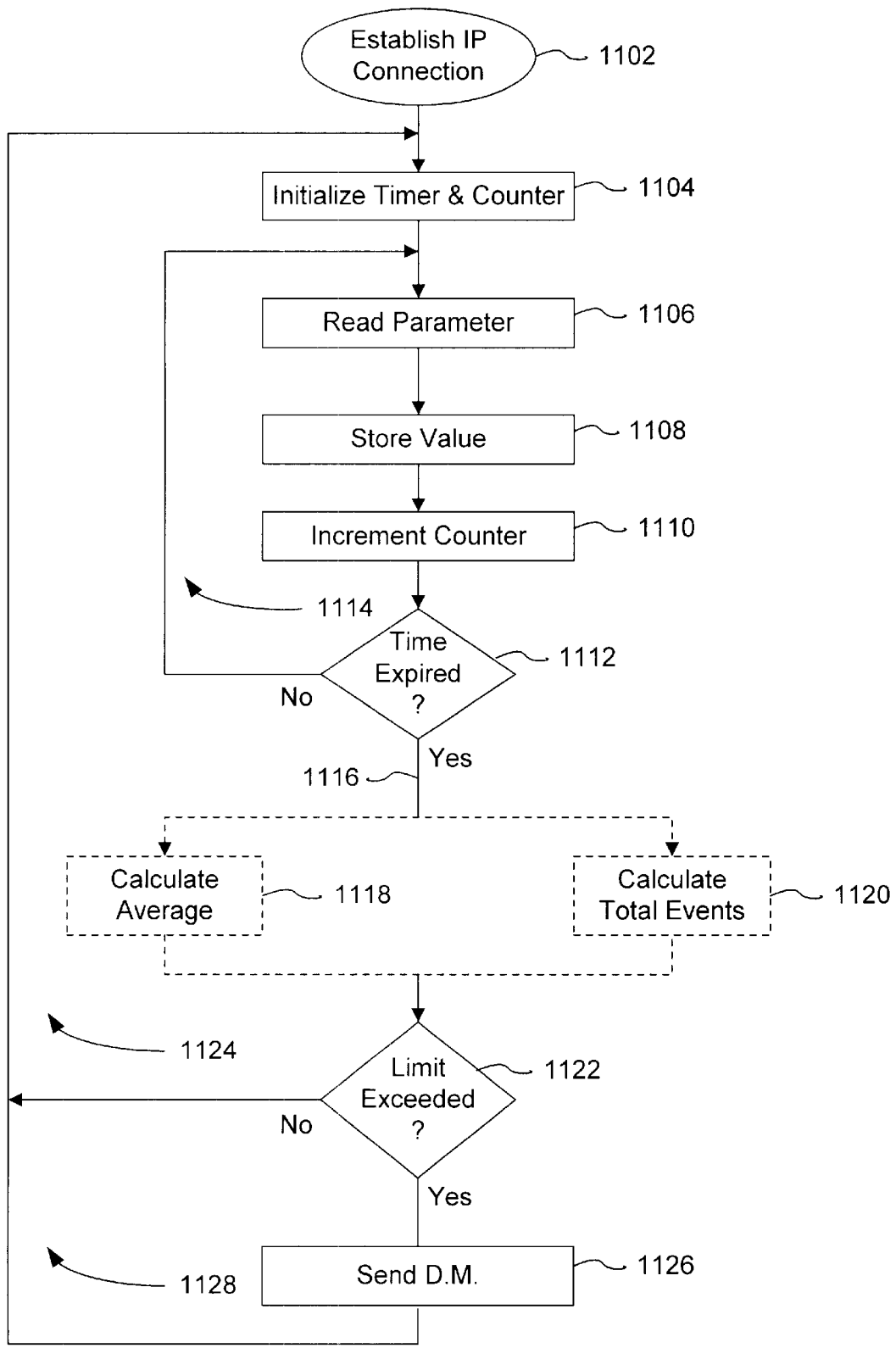
FIG. 11 illustrates an exemplary flow diagram for monitoring connection parameters of IP connections according further embodiments of the present invention.

FIG. 11 illustrates an exemplary flow diagram for monitoring connection perimeters of IP connections according to the present invention. In addition to silent and non-silent packet detection, other diagnostic parameters can also be monitored on an average or total event approach. The flow diagram of FIG. 11 illustrates both approaches. Parameters that can be measured according to an average packet count include jitter, and playout delay. Parameters that can be monitored on a total event basis include the number of packets, dropped packets, invalid header packets, micro-overflow, missing payload, and lost packets that were replaced by preceding packets. As would be apparent to one skilled in the relevant art, these listed parameters are provided by way of example and not limitation.

The detection of diagnostic parameters begins once an IP connection is established, as shown at step 1102. A timer and counter are initialized in a step 1104. The parameter being monitored is read at a step 1106 and its value stored at a step 1108. Then, the counter is incremented at step 1110. If the time limit has not expired at a step 1112, monitoring continues as shown generally at a loop 1114. If time has expired at a step 1116, either the average is calculated at step 1118 or the total is calculated at a step 1120. If a predetermined average or total event limit is not exceeded at a step 1122, the timer and counter are simply reinitialized and the process continues, as shown generally at a loop 1124. If an average or total event limit is exceeded, then the TE performing the detection of diagnostic parameters transmits a DM to the DS (or other device as configured by the DCM), as shown at a step 1126. The detection process continues for the parameter of interest as shown generally at a loop 1128.

The detection/monitoring of diagnostic parameters can be performed by one or more TEs involved in an IP connection. Any given TE can perform diagnostic parameter detection/monitoring for any given parameter. The type of calculation (average or total count) and the time and total count limits are set according to the network administrator via DCMs, as described above in connection with Table 1.

Figure 12:
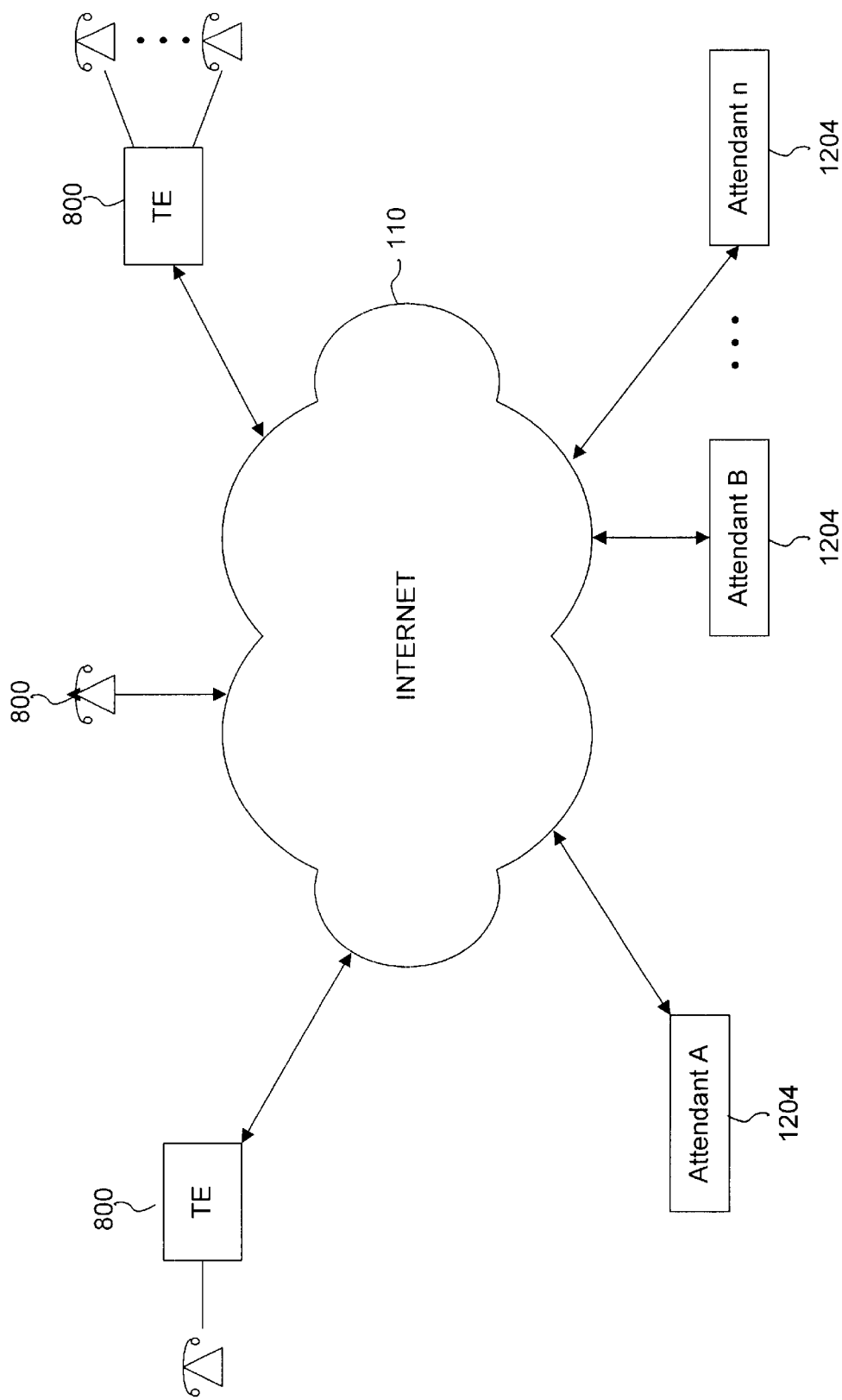
FIG. 12 illustrates various types of TEs in a system for attendant supervision of IP connections according to an embodiment of the present invention.

Another embodiment of the present invention taking advantage of diagnostic information is called "attendant supervision." FIG. 12 illustrates various types of TEs in a system for attendant supervision of IP connections according to the present invention. FIG. 12 illustrates various TEs at 800. These TEs can take on various configurations as discussed above in connection with FIG. 2. The TEs communicate via the Internet 110. In this embodiment, one or more attendants (A, B through n) are shown at 1204. TEs 800 and one or more attendants 1204 comprise a communications network. At an attendant 1204 a human operator (called the "attendant") can monitor IP connections by TEs 800.

Using an information element format similar, to those described above in connection with the DCMs and DMs (listed in Tables 1 and 2), an attendant 1204 can function as a diagnostic supervisor to provide real-time connection supervision. For example, diagnostic information can be provided to an attendant 1204 concerning whether a user at a TE is currently on the phone and unable to take an incoming call. Based on this information the attendant 1204 can answer the incoming call and alert the caller that the TE is currently on another call, or is otherwise generally unavailable. Alternatively, diagnostic information can be transmitted to the attendant 1204 from a TE if that TE wishes to forward all incoming calls to the attendant 1204. In this manner the attendant 1204 can answer all forwarded calls intended for that TE. The attendant 1204 can view the status (call information) of network users on the screen of an attendant's computer, workstation, or on an intelligent IP phone, for example. The computer, workstation, or intelligent IP phone provides an interface for the attendant 1204 to monitor telephone network calls, or the like.

The one or more attendants 1204 are therefore capable of performing similar call functions that a operator of a communications system can perform. Although the communication network is comprised of TEs and attendants that are located at different geographical locations, call information can be sent to the attendant or attendants in the same manner that diagnostic information is transferred to the DS in the previously discussed embodiments.

Figure 13:
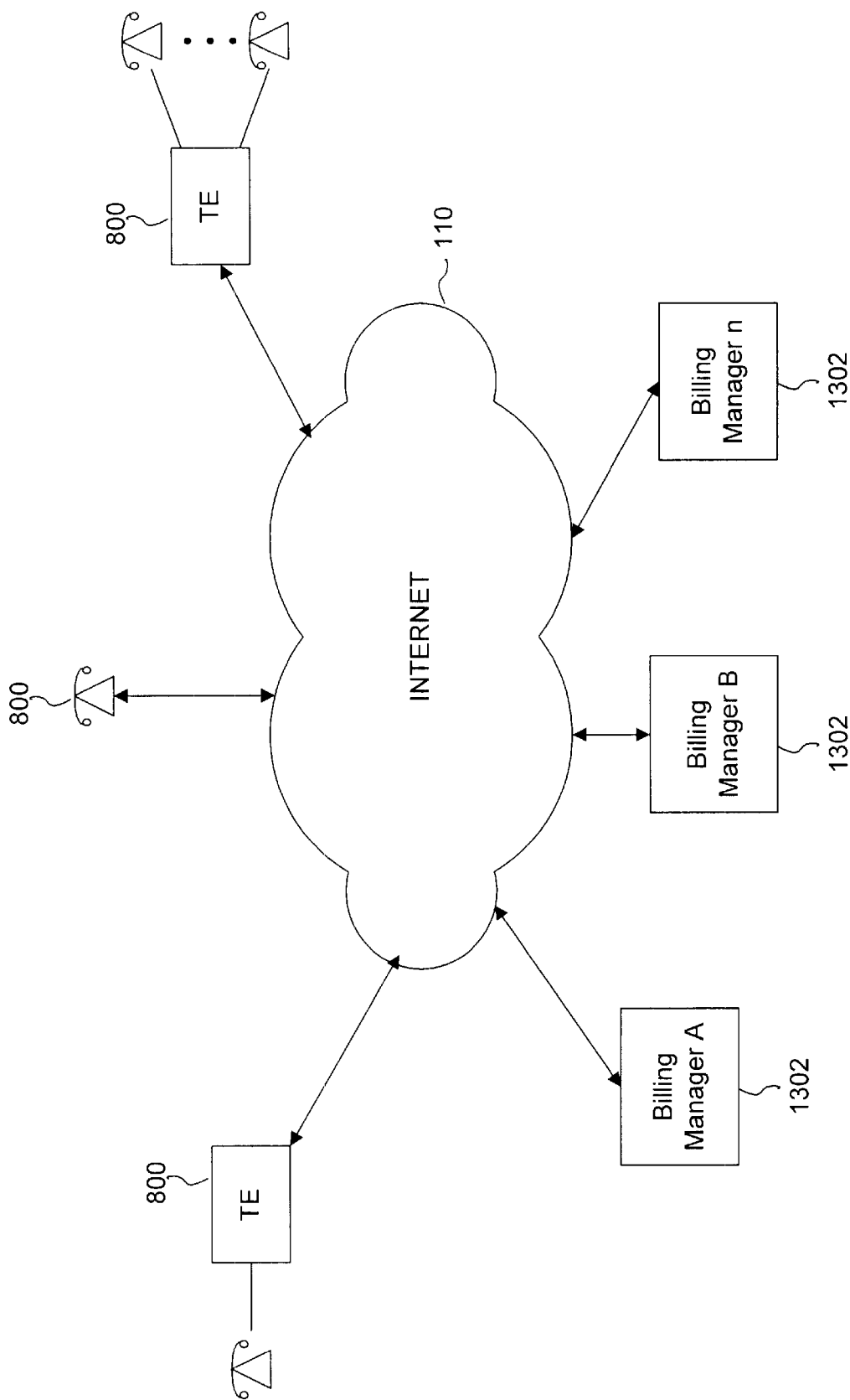
FIG. 13 illustrates various types of TEs in a system for billing management of IP connections according to an embodiment of the present invention.

FIG. 13 illustrates various types of TEs in a system for billing management of Internet connections according to the present invention. In this embodiment, one or more billing managers (A, B through n) 1302 collect and process billing information for IP connections over the Internet 110 by the TEs 800. In a similar manner in which call information is provided to attendants 1204 in the embodiment shown in FIG. 12, a billing protocol can be established for transmitting billing information to the billing manager 1302. The billing protocol would comprise a similar syntax as the information element formats for DCMs and DMs as described above in connection with Tables 1 and 2. Billing for IP connection services can be achieved in this manner.

III. HARDWARE AND SOFTWARE IMPLEMENTATIONS

The various managers, controllers and generators of the present invention can perform specific features, which in effect comprise a computer system or portions thereof. Such a computer system includes, for example, one or more processors that are connected to a communication bus. Although telephony-specific hardware can be used to implement the present invention, the following description of a general purpose computer system is provided for completeness.

The computer system can also include main memory and can also include secondary memory. The secondary memory can include, for example, a hard disk drive and/or a removable storage drive, representing a floppy disk drive, a magnetic tape drive, an optical disk drive, and the like. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface to remote storage and the like. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Examples of communications interfaces include, but are not limited to a modem, a network interface (such as an Ethernet card), a communications port, a PCMCIA slot and card, etc. Software and data transferred via the communications interface are in the form of signals which can be electronic, electromagnetic, optical or other signals capable of being received by the communications interface. These signals are provided to communications interface via a channel that can be implemented using wire or cable, fiber optics, a phone line, a cellular phone link, an RF link, and the like.

In this document, the terms "computer program medium" and "computer usable medium" are used to generally refer to media such as a removable storage device, and a hard disk drive. Computer programs are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable the processor to perform features of the present invention. Accordingly, such computer programs represent controllers of the computer system.

In an embodiment where the invention is implemented using software, the software can be stored in a computer program and loaded into the computer system using the removable storage drive, the hard drive or the communications interface. The control logic (software), when executed by the processor, causes the processor to perform certain functions of the invention as described herein.

In another embodiment, features of the invention are implemented primarily in hardware using, for example, hardware components such as application specific integrated circuits (ASICs) and the like. Implementation of the hardware state machine so as to perform the functions described herein will be apparent to persons skilled in the relevant art(s).

In yet another embodiment, features of the invention can be implemented using a combination of both hardware and software.

IV. CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for managing diagnostic and performance information for communications system terminal endpoints (TEs) communicating over an Internet Protocol (IP) network, comprising the steps of:

transmitting a Diagnostic Configuration Message (DCM) from a Diagnostic Supervisor (DS) to the TEs, wherein the DS is capable of being coupled to the communications systems;

generating Diagnostic Messages (DMs) at the TEs based on diagnostic information concerning IP network connections in which the TEs participate, wherein said DCM instructs the TEs how to format and under what criteria to transmit said DMs; and transmitting said DMs from said TEs to said DS or to a plurality of DSs.

2. The method according to claim 1, further comprising the step of transmitting said DMs to one or more TEs.

3. The method according to claim 1, further comprising the step of providing the DS with TE communication capabilities.

4. The method according to claim 1, further comprising the step of providing the TEs with DS capabilities.

5. The method according to claim 1, further comprising the step of generating diagnostic reports based on said DMs.

6. The method according to claim 1, wherein said connections are voice, modem, facsimile, video or data transmissions.

7. The method according to claim 6, wherein said diagnostic information comprises error statistics, voice statistics, modem statistics, facsimile statistics, video statistics or data statistics.

8. The method according to claim 1, further comprising the step of rerouting an IP network connection between two or more TEs to the public switched telephone network (PSTN) based on said diagnostic information.

9. The method according to claim 8, wherein said rerouting is initiated by the DS.

10. The method according to claim 8, wherein said rerouting is initiated by a TE.

11. The method according to claim 8, wherein said rerouting is initiated by a TE with DS capabilities.

12. The method according to claim 8, wherein said rerouting is initiated by a TE user, a network administrator or a communications system attendant.

13. The method according to claim 1, further comprising the step of configuring DCMs to instruct TEs to transmit DMs including silent packet diagnostic information.

14. The method according to claim 13, further comprising the step of providing disconnect supervision using said silent packet diagnostic information.

15. The method according to claim 1, further comprising the step of configuring DCMs to instruct TEs to transmit DMs including non-silent packet diagnostic information.

16. The method according to claim 15, further comprising the step of providing answer detection using said non-silent packet diagnostic information.

17. The method according to claim 1, further comprising the step of providing attendant supervision of the communications system, wherein a human attendant provides real-time response to said diagnostic information.

18. The method according to claim 1, further comprising the step of providing billing management of the communications system, wherein billing of an IP network connection is performed based on said diagnostic information.

19. The method according to claim 8, further comprising the step of providing billing management of the communications system, wherein billing for said rerouting is performed based on said diagnostic information.

20. The method according to claim 1, wherein said diagnostic information comprises a plurality of parameters defined by the DCMs and the DMs, and said method further comprising the step of determining, over a predetermined time period, at least one of:
   an average number of occurrences of one of said plurality of parameters,
   a percentage of occurrences of one of said plurality of parameters,
   a maximum number of occurrences of one or said plurality of parameters, and
   an actual number of occurrences of one of said plurality of parameters.

21. A system for managing diagnostic information for a communications system, comprising:
   a plurality of terminal endpoints (TEs) capable of communicating over an Internet Protocol (IP) network; and
   a Diagnostic Supervisor (DS) capable of being coupled to the IP network,
   wherein said DS transmits a Diagnostic Configuration Message (DCM) to said TEs,
   wherein one or more of said TEs generate Diagnostic Messages (DMs) based on diagnostic information concerning IP network connections in which said one or more of said TEs participate, and
   wherein said DCM instructs the TEs how to format and when to transmit said DM to said DS or to a plurality of DSs and TEs.

22. The system according to claim 21, wherein said DS comprises at least one of:
   a Configuration Manager;
   a Report Manager;
   a Real-Time Response Manager; and
   an Input/Output (I/O) Manager.

23. The system according to claim 22, wherein said DS further comprises a communications system.

24. The system according to claim 22, wherein said I/O manager is coupled to the IP network and the public switched telephone network (PSTN).

25. The system according to claim 21, wherein
   said a plurality of TEs use the IP network for voice, modem, facsimile, video or data transmissions, and
   said diagnostic information comprises error statistics, voice statistics, facsimile statistics, video statistics or data statistics.

26. The system according to claim 21, wherein said Real-Time Response Manager reroutes an IP network connection between two or more TEs to the public switched telephone network (PSTN) based on said diagnostic information.

27. The system according to claim 22, wherein said Configuration Manager configures said DCMs to instruct one or more of said plurality of TEs to transmit DMs including silent packet diagnostic information.

28. The system according to claim 27, wherein said Real-Time Response Manager provides disconnect supervision using said silent packet diagnostic information.

29. The system according to claim 22, wherein said Configuration Manager configures said DCMs to instruct one or more of said plurality of TEs to transmit DMs including non-silent packet diagnostic information.

30. The system according to claim 29, wherein said Real-Time Response Manager provides answer detection using said non-silent packet diagnostic information.

31. The system according to claim 21, wherein said DS comprises an interface for attendant supervision of the communications system, enabling a human attendant to provide real-time response to said diagnostic information.

32. The system according to claim 21, wherein said DS comprises a billing manager for the communications system, thereby enabling billing of IP network connections based on said diagnostic information.

33. The system according to claim 26, wherein said DS comprises a billing manager for the communications system, thereby enabling billing of said rerouting based on said diagnostic information.

34. The system according to claim 22, wherein said diagnostic information comprises a plurality of parameters defined by the DCMs and the DMs, and said Real-Time Response Manager acts on said diagnostic information by determining an actual number of occurrences of one of said plurality of parameters.

35. A computer program product comprising a computer usable medium having control logic stored therein for causing a computer to manage diagnostic and performance information for communications system terminal endpoints (TEs) communicating over an Internet Protocol (IP) network, said control logic comprising:
   a first computer readable program code means for causing the computer to transmit a Diagnostic Configuration Message (DCM) from a Diagnostic Supervisor (DS) to the TEs, wherein the DS is capable of being coupled to the communications systems;
   a second computer readable program code means for causing the computer to generate Diagnostic Messages (DMs) at the TEs based on diagnostic information concerning IP network connections in which the TEs participate, wherein said DCM instructs the TEs how to format and under what criteria to transmit said DMs; and a third computer readable program code means for causing the computer to transmit said DMs from said TEs to said DS or to a plurality of DSs.

36. The computer program product according to claim 35, further comprising a fourth computer readable program code means for causing the computer to transmit said DMs to one or more TEs.

37. The computer program product according to claim 35, further comprising a fourth computer readable program code means for causing the computer to provide the DSs with TE communication capabilities.

38. The computer program product according to claim 35, further comprising a fourth computer readable program code means for causing the computer to provide the TEs with DS capabilities.

39. The computer program product according to claim 35, further comprising a fourth computer readable program code means for causing the computer to generate diagnostic reports based on said DMs.

40. The computer program product according to claim 35, wherein said connections are voice, modem, facsimile, video or data transmissions.

41. The computer program product according to claim 40, wherein said diagnostic information comprises error statistics, voice statistics, modem statistics, facsimile statistics, video statistics or data statistics.

42. The computer program product according to claim 35, further comprising a fourth computer readable program code means for causing the computer to reroute an IP network connection between two or more TEs to the public switched telephone network (PSTN) based on said diagnostic information.

43. The computer program product according to claim 42, wherein said rerouting is initiated by the DS.

44. The computer program product according to claim 42, wherein said rerouting is initiated by a TE.

45. The computer program product according to claim 42, wherein said rerouting is initiated by a TE with DS capabilities.

46. The computer program product according to claim 42, wherein said rerouting is initiated by a TE user, a network administrator or a communications system attendant.

47. The computer program product according to claim 35, further comprising a fourth computer readable program code means for causing the computer to configure said DCMs to instruct TEs to transmit DMs including silent packet diagnostic information.

48. The computer program product according to claim 47, further comprising a fifth computer readable program code means for causing the computer to provide disconnect supervision using said silent packet diagnostic information.

49. The computer program product according to claim 35, further comprising a fourth computer readable program code means for causing the computer to configure DCMs to instruct TEs to transmit DMs including non-silent packet diagnostic information.

50. The computer program product according to claim 49, further comprising a fifth computer readable program code means for causing the computer to providing answer detection using said non-silent packet diagnostic information.

51. The computer program product according to claim 35, further comprising a fourth computer readable program code means for causing the computer to provide attendant supervision of the communications system, wherein a human attendant provides real-time response to said diagnostic information.

52. The computer program product according to claim 35, further comprising a fourth computer readable program code means for causing the computer to provide billing management of the communications system, wherein billing of an IP network connection is performed based on said diagnostic information.

53. The computer program product according to claim 42, further comprising a fifth computer readable program code means for causing the computer to provide billing management of the communications system, wherein billing for said rerouting is performed based on said diagnostic information.

54. The computer program product according to claim 35, wherein said diagnostic information comprises a plurality of parameters defined by the DCMs and the DMs, and said computer program product further comprises a fourth computer readable program code means for causing the computer to determine an actual number of occurrences of one of said plurality of parameters.

* * * * *